United States Patent
Teoh et al.

(10) Patent No.: US 12,469,046 B2
(45) Date of Patent: Nov. 11, 2025

(54) PREDICTING PERFORMANCE OF CREATIVE CONTENT

(71) Applicant: Shutterstock, Inc., New York, NY (US)

(72) Inventors: Emily Teoh, Dublin (IE); Diarmaid Finnerty, Dublin (IE); Lauren Sarah Burnham-King, Dublin (IE); Veronica Darling, Denver, CO (US); Alessandra Sala, Dublin (IE)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 17/937,342

(22) Filed: Sep. 30, 2022

(65) Prior Publication Data

US 2024/0112217 A1    Apr. 4, 2024

(51) Int. Cl.
G06Q 30/00     (2023.01)
G06F 3/0482    (2013.01)
G06Q 30/0242   (2023.01)
G06V 20/30     (2022.01)
G05B 19/418    (2006.01)

(52) U.S. Cl.
CPC ....... *G06Q 30/0242* (2013.01); *G06F 3/0482* (2013.01); *G06V 20/30* (2022.01); *G06V 2201/10* (2022.01)

(58) Field of Classification Search
CPC .......... G06Q 30/0242; G06Q 30/0244; G06Q 30/0246; G06Q 30/0254; G06Q 30/0277; G06F 3/0482; G06V 20/30; G06V 2201/10; G06N 5/022; G06N 20/00
See application file for complete search history.

(56) References Cited

U.S. PATENT DOCUMENTS 8,995,716 B1 *   3/2015   Zomet ............... G06F 16/583
                                                        382/103
2017/0277970 A1 *   9/2017   Sigal ............... G06V 30/414
(Continued)

OTHER PUBLICATIONS

Grabner et al., Visual interestingness in image sequences, Oct. 21, 2013, Theory of Computing, ACM, pp. 1017-1026 (Year: 2013).*
(Continued)

*Primary Examiner* — Maria V Vanderhorst
(74) *Attorney, Agent, or Firm* — McDermott Will & Schulte LLP

(57) ABSTRACT

Methods and systems for predicting performance of creative content are disclosed. Exemplary implementations may: receive a collection of images; provide a context to a user; serially cause display of pairs of images on a computer interface; receive user responses indicating which image of each pair is preferred given the context; determine a resonance value for each image based on a number of times the user responses indicate each image is preferred when displayed in a pair of images; determine a confidence score for each image; generate one or more models for predicting image performance based on one or more of the resonance value and the confidence score for each image; receive a plurality of candidate images; determine, using at least one model, a first metric set for each candidate; and cause display of a listing of the candidate images, the listing including the first metric set for each candidate image.

18 Claims, 8 Drawing Sheets

(56) References Cited

U.S. PATENT DOCUMENTS

2020/0327671 A1* 10/2020 Arbel .................... G06F 3/0486
2021/0357682 A1* 11/2021 Route ................. G06F 18/2155
2022/0108176 A1*  4/2022 Kehler ................... G06F 40/30
2022/0150553 A1*  5/2022 Ravuru ............ H04N 21/23439

OTHER PUBLICATIONS

Dongfei et al., On the Selection of Trending Image From the Web, Jun. 29, 2015, IEEE, pp. 1-6 (Year: 2015).*
"Learning Crowdsourced User Preferences for Visual Summarization of Image Collections". IEEE. 2013. (Year: 2013).*
"Interpreting the Rhetoric of Visual Advertisements". IEEE. 2021. (Year: 2021).*
US/ISA—International Search Report and Written Opinion Report for related International Application No. PCT/US2023/033830 mailed Nov. 23, 2023, 14 pgs.

* cited by examiner

PREDICTING PERFORMANCE OF CREATIVE CONTENT

TECHNICAL FIELD

The present disclosure generally relates to predicting performance of creative content. More particularly, the present disclosure relates to predicting performance of creative content (e.g., images, advertisements containing images, and/or advertising campaigns) such that informed creative content recommendations may be made.

BACKGROUND

Digital advertisers use creative content, such as photos and videos, to target their audiences. On today's digital platforms, studies have shown that users or audiences give creative content less than a quarter-second of attention. Thus, in the blink of an eye, users are making the choice to either engage with or abandon an advertisement. Such a short duration puts a lot of pressure on advertisers and marketing professionals on appropriate image selection, placement, and the like, for advertisements placed on digital platforms.

Current techniques for image selection and placement in digital advertisements are lacking due to the large number of potential images available for placement, only a few of which may equate to enhancing the value of the creative content due to higher resonance with the audience versus the alternatives.

BRIEF SUMMARY

Aspects of the present disclosure generally relate to predicting performance of creative content (e.g., images, advertisements containing images, and/or advertising campaigns) by assigning labels based on human subjective preferences to images using an artificial intelligence (AI) algorithm. For the purposes of this disclosure, the terms "segment" or "audience segment" may refer to an audience cohort (i.e., a group of people identified together as a group). For instance, an example of an audience segment is "people who enjoy running," or "people who like a certain genre of music (e.g., heavy metal)," or "young people who like traveling." In some cases, a segment may refer to an audience targeting vector, and may be associated with advertising bid factors, interests or affinities, location, demographics, etc., to name a few examples. Further, for the purposes of this disclosure, the term "model" may be used to refer to a scoring model, such as a general audience model, a social media platform/website model, or an interest-based model (e.g., health and fitness, art, music, fashion, food, etc.). In some other cases, the term "model" may refer to a context detection model (e.g., for location or social context), an aesthetic and/or technical classifier model, or a natural language processing (NLP)-based segment detector model.

In some aspects, the present disclosure also may relate to predicting performance of creative content, such as an advertisement, when a certain image or collection of images is utilized for the content. Studies have shown that humans tend to relate more positively to images that are familiar to them, invoke a sense of happiness (e.g., positive memories), are visually appealing to them, or are awe-inspiring to them. However, different people find different images appealing, and an image used in an advertisement might elicit engagement from one audience member but not another. Further, the context in which an image is used in creative content also might play a role in whether a user or audience member engages with or abandons the content.

In some embodiments, the system described in this disclosure may comprise predictive image intelligence capability based on artificial intelligence (e.g., machine learning (ML)). The system may utilize classifiers and human response data for subjective classification of images which may enhance image selection. In some cases, the system may identify different audience segments or cohorts within an audience (e.g., a set of users). The system may collect user responses from the audience, or alternatively, from an audience segment, where the user responses include selection or non-selection of images when shown in pairwise comparisons with other images given a particular context. For instance, the system may display, to a user (e.g., general user, fitness enthusiast, running enthusiast), an image of a person running next to an image of a person crossing a race finish line and ask the user to select which of the two images would be most suitable in an advertisement for a running brand given a context of "shoes." The system may gather human subjective responses for pairwise image comparisons in relation to a given context and feed the collected data into a classifier or machine-learning algorithm. The classifier or machine-learning algorithm may be trained using the collected data (also referred to as the training dataset) to assign subjective classification labels (e.g., resonance values and confidence scores) to other images given a particular context.

In some examples, the classifier or machine-learning algorithm may identify one or more attributes of the images in the training dataset, where the attributes may include pixel-related information, stylistic information, and/or an image vector. While not necessary, in some examples, the attributes also may include keyword metadata or tags. In some cases, the keyword metadata or tags may be human generated. Alternatively, the keyword metadata or tags may be machine-generated using computer vision techniques. In some embodiments, the system may classify images from a wide variety of sources (e.g., social media platforms, websites, image group boards or forums, stock image sites, etc.) based on their predicted performance with the different audience or focus groups. In some cases, the predicted performance may be based, at least in part, on a context. For instance, a photo of a person running may elicit a positive response from a user placed in a "running" audience segment, when the given context is "shoes." However, a business-minded professional may be indifferent (e.g., abandon the advertisement) when shown the same image and given the same context (i.e., shoes). To the business-minded professional user, an image of a man wearing a suit and Oxford shoes may elicit a positive response (e.g., cause the user to follow the advertisement), given the "shoes" context. It should be noted that these are merely examples, and not intended to be limiting.

One aspect of the present disclosure relates to a method for predicting performance of creative content (e.g., images, advertisements containing images, and/or advertising campaigns). The method may include receiving a collection of images from one or more image sources. The method may include providing a context to at least one user. The method may include serially causing display of pairs of images from the collection of images on a computer interface. The method may include receiving, from the at least one user, user responses indicative of which image of each pair of images displayed on the computer interface is preferred in view of the context. The method may include determining, using a ranking algorithm, a resonance value for each image of the collection of images based, at least in part, on a number of times the user responses indicate each image is preferred when displayed in a pair of images. The method may include determining, using the ranking algorithm, a confidence score in the resonance value for each image of the collection of images. The method may include generating one or more models for predicting image performance based, at least in part, on one or more of the resonance value and the confidence score for each image of the collection of images. The method may include receiving a plurality of candidate images for a creative campaign. The method may include determining, using at least one model of the one or more models, a first set of metrics for each candidate image of the plurality of candidate images. The method may include causing display of a listing of the plurality of candidate images, wherein the listing comprises the first set of metrics for each of the plurality of candidate images, and wherein the first set of metrics for each candidate image includes at least one of a predicted candidate image resonance value and a predicted candidate image confidence score.

Another aspect of the present disclosure relates to a system configured for predicting performance of creative content (e.g., images, advertisements containing images, and/or advertising campaigns). The system may include one or more hardware processors configured by machine-readable instructions. In some embodiments, a graph data structure is a tool to pair up images before we display them to annotators. That is, for each audience segment, the system curates a collection of images. In some embodiments, before serially causing a display of pairs of images from the collection on a computer interface, some embodiments include pairing up images within the collection for comparison instead of comparing every single image each against every other image (expensive in terms of annotation time and costs), but at the same time not have isolated groups of image pair comparisons. Accordingly, the system generates a random graph with a specified number of edges/links that each node should have, where each node corresponds to an image within the collection. The image pairs are formed from the two nodes delimiting each of the edges/links in the graph. The processor(s) may be configured to serially cause display of pairs of images from the collection of images on a computer interface. The processor(s) may be configured to receive, from the at least one user, user responses indicative of which image of each pair of images displayed on the computer interface is preferred in view of the context. The processor(s) may be configured to determine, using a ranking algorithm, a resonance value for each image of the collection of images based, at least in part, on a number of times the user responses indicate each image is preferred when displayed in a pair of images. The processor(s) may be configured to determine, using the ranking algorithm, a confidence score in the resonance value for each image of the collection of images. The processor(s) may be configured to generate one or more models for predicting image performance based, at least in part, on one or more of the resonance value and the confidence score for each image of the collection of images. The processor(s) may be configured to receive a plurality of candidate images for a creative campaign. The processor(s) may be configured to determine, using at least one model of the one or more models, a first set of metrics for each candidate image of the plurality of candidate images. The processor(s) may be configured to cause display of a listing of the plurality of candidate images, wherein the listing comprises the first set of metrics for each of the plurality of candidate images, and wherein the first set of metrics for each candidate image includes at least one of a predicted candidate image resonance value and a predicted candidate image confidence score.

Yet another aspect of the present disclosure relates to a non-transient computer-readable storage medium having instructions embodied thereon, the instructions being executable by one or more processors to perform a method for predicting performance of creative content (e.g., images, advertisements containing images, and/or advertising campaign). The method may include receiving a collection of images from one or more image sources. The method may include providing a context to at least one user. The method may include serially causing display of pairs of images from the collection of images on a computer interface. The method may include receiving, from the at least one user, user responses indicative of which image of each pair of images displayed on the computer interface is preferred in view of the context. The method may include determining, using a ranking algorithm, a resonance value for each image of the collection of images based, at least in part, on a number of times the user responses indicate each image is preferred when displayed in a pair of images. The method may include determining, using the ranking algorithm, a confidence score in the resonance value for each image of the collection of images. The method may include aggregating user response data based on receiving the user responses for the pairs of images from the collection of images. The method may include generating a training dataset comprising at least the collection of images, information pertaining to the node in the context segment graph, and the aggregated user response data. The method may include generating one or more models for predicting image performance based, at least in part, on one or more of the resonance value and the confidence score for each image of the collection of images by training a machine learning algorithm to label each candidate image of a plurality of candidate images with a respective candidate image resonance value, wherein the machine learning algorithm is trained using the generated training dataset. The method may include determining, using at least one model of the one or more models, a first set of metrics for each candidate image of the plurality of candidate images. The method may include causing display of a listing of the plurality of candidate images, wherein the listing comprises the first set of metrics for each of the plurality of candidate images, and wherein the first set of metrics for each candidate image includes at least one of a predicted candidate image resonance value and a predicted candidate image confidence score.

Still another aspect of the present disclosure relates to a system configured for predicting performance of creative content (e.g., images, advertisements containing images, and/or advertising campaigns). The system may include means for receiving a collection of images from one or more image sources. The system may include means for providing a context to at least one user. The system may include means for serially causing display of pairs of images from the collection of images on a computer interface. The system may include means for receiving, from the at least one user, user responses indicative of which image of each pair of images displayed on the computer interface is preferred in view of the context. The system may include means for determining, using a ranking algorithm, a resonance value for each image of the collection of images based, at least in part, on a number of times the user responses indicate each image is preferred when displayed in a pair of images. The system may include means for determining, using the ranking algorithm, a confidence score in the resonance value for each image of the collection of images. The system may include means for generating one or more models for predicting image performance based, at least in part, on one or more of the resonance value and the confidence score for each image of the collection of images. The system may include means for receiving a plurality of candidate images for a creative campaign. The system may include means for determining, using at least one model of the one or more models, a first set of metrics for each candidate image of the plurality of candidate images. The system may include means for causing display of a listing of the plurality of candidate images, wherein the listing comprises the first set of metrics for each of the plurality of candidate images, and wherein the first set of metrics for each candidate image includes at least one of a predicted candidate image resonance value and a predicted candidate image confidence score.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
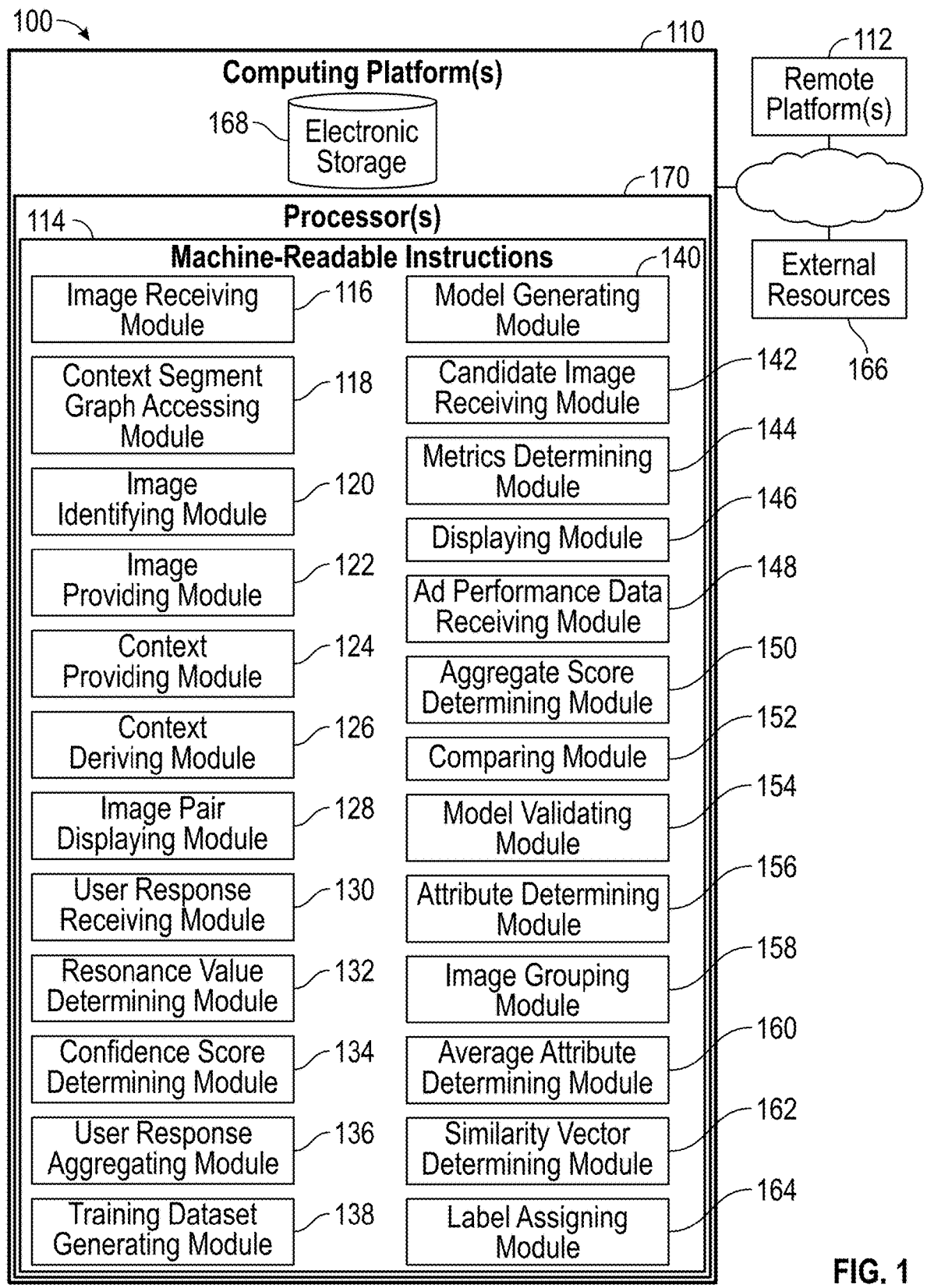
FIG. 1 illustrates a system configured for predicting performance of creative content (e.g., images, advertisements containing images, and/or advertising campaigns), in accordance with one or more implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

As detailed herein, the disclosure generally relates to a system and a method for predicting performance of creative content (such as images, advertisements containing images, and/or advertising campaigns) based on artificial intelligence (AI) (e.g., machine learning (ML)) labeling of imagery. In some embodiments, the system described in this disclosure may comprise predictive image intelligence capability based on AI. In some cases, the system (e.g., systems 100, 700, and/or 800) may identify different audience segments or cohorts within a larger audience (e.g., a set of users). Further, the system may classify images from a wide variety of sources (e.g., social media, websites, image group boards or forums, stock image sites, etc.) based on their predicted performance with the different audience segments. In some cases, the predicted performance may be based, at least in part, on a context. As described above, the system may utilize classifiers and human response data (e.g., user responses in pairwise image comparisons given a context) to generate classification labels based on human subjective preferences for future candidate images. It should be noted that, the future candidate images may not be included in the training dataset of images used to encode the classifier. The classifier may be an example of an AI or ML algorithm. Some non-limiting examples of classification labels based on human subjective preferences may include a resonance value and a confidence score in the resonance value. The training dataset fed into the classifier may include a set of images and user responses for pairwise comparisons including the images given a context, as well as resonance values and confidence scores for the images given the context. In this way, the classifier may be used to predict resonance values and confidence scores for future candidate images given a context.

In some embodiments, after collecting and picking images from a plurality of image sources, the system may be configured to generate and run models, for instance an advertisement score model. In some cases, the model may comprise a supervised machine learning model utilizing classifiers (e.g., a convolutional neural network (CNN)). In some cases, such a model may also be referred to as a segment-based CNN. Different types of advertisement score models may be utilized based on the target audience, audience group, focus group, etc. For instance, a social media advertisement score model may refer to an ML model for predicting if an average social media user might find an image or subset of images appealing given a context. In another example, a health and fitness audience model may be used to predict an image or subset of images that users from a health and fitness audience segment might find more appealing. It should be noted that, the predictions described throughout this disclosure may be based, at least in part, on a given context. In other words, given an image or collection of images and a context, what would a person (e.g., general audience, social media user, particular interests user, etc.) think of said image (or collection of images).

Aspects of the present disclosure may be akin to giving potential audience members or users "a seat at the creative process table." For instance, potential audience members may be provided a context and asked for feedback on pairwise image comparisons. Further, their feedback may be incorporated into the ML model to gain some scale out of the model. In other words, feedback received from a large number of potential audience members may serve to ensure that the images used in creatives (e.g., images, advertisements containing images, and/or advertising campaigns) are an adequate representation of them, appealing to them, more likely to elicit engagement from them, etc. Thus, instead of relying on an advertisement designer or a digital brand manager or a marketing manager for their opinion on how well an image would perform in an advertisement campaign, the ML model utilizes qualitative insight from actual potential audience members, at scale. In some cases, labels, such as resonance values and confidence scores, may be determined for images associated with a particular segment. In one example, at least 5,000 images and 30,000 labels may be utilized to generate a model, although different numbers of images and labels are contemplated in other embodiments. In some cases, a higher number of images and/or labels may correlate to a more accurate model.

In some embodiments, the system may access a context segment graph (e.g., shown as context segment graph 600 in FIG. 6, more fully described below) comprising one or more nodes, where each node is associated with an image. Images in the graph may be associated with a context or theme, such as an interest-based segment, a business segment, and/or an audience segment, to name a few non-limiting examples. In some aspects, the context segment graph may comprise any one of a taxonomy of interests, business segments, or audience cohorts, such as fitness, fashion, food, art, music, etc. It should be noted that the examples listed above are non-limiting, and different interests, business segments or audience cohorts may be contemplated in different embodiments. Further, the segments may be narrower (e.g., Italian food, or CrossFit fitness) or broader than those listed above. A group of descriptive terms might include "small business," "entrepreneur," "marketplace," "market," "growth," and/or product names. Accordingly, the system may choose the two nodes at the end of one of the edges in the context segment graph as a pair of images to be displayed for user selection, as disclosed herein.

In some embodiments, an image subset related to a node in the context segment graph may be selected. Further, human response data for the images in the subset in context to (or given) that node may be aggregated, as more fully described below. In some cases, the human response data may be collected from direct or indirect audience feedback. For example, users might be provided a context cue, for instance, "Which image of these two images would you prefer in a running advertisement?" In some embodiments, multiple users may be queried, and their answers averaged. Further, the image subset and the aggregated answers may be used to generate the training dataset. In this way, one or more models may be trained with hundreds, thousands, or even millions of images, each with a plurality of answers to these questions from actual people.

Turning now to FIG. 1, illustrated is a system 100 configured for predicting performance of creative content (e.g., images, advertisements containing images, and/or advertising campaigns), according to certain aspects of the disclosure. In some implementations, system 100 may include one or more computing platforms 110. Computing platform(s) 110 may be configured to communicate with one or more remote platforms 112 according to a client/server architecture, a peer-to-peer architecture, and/or other architectures. Remote platform(s) 112 may be configured to communicate with other remote platforms via computing platform(s) 110 and/or according to a client/server architecture, a peer-to-peer architecture, and/or other architectures. Users may access system 100 via remote platform(s) 112.

Computing platform(s) 110 may be configured by machine-readable instructions 114. Machine-readable instructions 114 may include one or more instruction modules. The instruction modules may include computer program modules. The instruction modules may include one or more of image receiving module 116, context segment graph accessing module 118, image identifying module 120, image providing module 122, context providing module 124, context deriving module 126, image pair displaying module 128, user response receiving module 130, resonance value determining module 132, confidence score determining module 134, user response aggregating module 136, training dataset generating module 138, model generating module 140, candidate image receiving module 142, metrics determining module 144, displaying module 146, advertisement performance data receiving module 148, aggregate score determining module 150, comparing module 152, model validating module 154, attribute determining module 156, image grouping module 158, average attribute determining module 160, similarity vector determining module 162, label assigning module 164, and/or other instruction modules.

Image receiving module 116 may be configured to receive a collection of images from one or more image sources. In aspects, the one or more sources may include, by way of non-limiting examples, social media platforms, websites, image group boards or forums, stock image sites, and the like.

Context segment graph accessing module 118 may be configured to access a context segment graph comprising one or more nodes or images associated with a given segment. In aspects, the segment may be selected from a group consisting of an interest-based segment, a business segment, and an audience segment. In aspects, the one or more segment categories may be selected from a group consisting of fashion, fitness, food, business, creative, real estate, beauty, medical, consumer goods, travel, outdoors, and home services.

In some aspects, one or more images may be associated with one or more nodes in the context segment graph. In this regard, image identifying module 120 may be configured to identify one or more images as related to a node or multiple nodes of a context segment graph (as more fully described below with reference to FIG. 6).

Image providing module 122 may be configured to provide identified images (e.g., images identified by image identifying module 120), for instance, for use in providing pairwise comparisons of images to users, as more fully described below. In aspects, image providing module 122 may be configured to provide identified images to image receiving module 116.

Context providing module 124 may be configured to provide a context to at least one user. In aspects, context providing module 124 may be configured to provide a context to at least one user by causing display of a context identifier (e.g., a word, a combination of words, a question, or the like) on a computer interface.

Context deriving module 126 may be configured to derive the context from information pertaining to the node in the context segment graph. In aspects, the information pertaining to the node in the context segment graph may include, by way of example only, words, combinations of words, interest-based identifiers, audience cohort identifiers, business segment identifiers, and the like.

Image pair displaying module 128 may be configured to serially display pairs of images from the collection of images on a computer interface. In aspects, image pair displaying module 128 may be configured to display two images from the collection of images side-by-side or one above the other on the computer interface. In aspects, image pair displaying module 128 may be configured to display pairs of images for a finite period of time (e.g., ten seconds) or until a user response is received (e.g., by user response receiving module 130, more fully described below). In aspects, image pair displaying module 128 may be configured to serially or sequentially display pairs of images from the collection of images until all images in the collection of images have been displayed in a pair of images a predetermined number of times (e.g., four times). In aspects, image pair displaying module 128 may be configured to randomly select images for pairwise display, for instance, to minimize the likelihood that the same two images will be displayed in a pair of images more than once.

User response receiving module 130 may be configured to receive, from the at least one user, user responses indicative of which image of each pair of images displayed on the computer interface is preferred in view of the context. In aspects, user response receiving module 130 may receive selection of one image of each pair of images as the preferred image given the context upon the user selecting a particular keyboard character or function. In aspects, user response receiving module 130 may receive selection of one image of each pair of images as the preferred image given the context upon the user selecting the image on a touch-screen computer interface. In aspects, user response receiving module 130 may be configured to receive user responses indicative of "no preference" when a user indicates no preference between the two images comprising a pair of images in view of the context.

Resonance value determining module 132 may be configured to determine, using a ranking algorithm, a resonance value for each image of the collection of images based, at least in part, on a number of times the user responses indicate each image is preferred when displayed in a pair of images. By way of example and not limitation, resonance value determining module 132 may be configured to determine a resonance value for each image of the collection of images using a skill-based ranking system, which system is known to those having ordinary skill in the art.

Confidence score determining module 134 may be configured to determine, using the ranking algorithm, a confidence score in the resonance value for each image of the collection of images. By way of example and not limitation, confidence score determining module 134 may be configured to determine a confidence score in the resonance value for each image of the collection of images using the skill-based ranking system.

User response aggregating module 136 may be configured to aggregate user response data based on receiving the user responses for the pairs of images from the collection of images.

Training dataset generating module 138 may be configured to generate a training dataset. In aspects, the training dataset may comprise the collection of images. In aspects, the training dataset may comprise information pertaining to the node in the context segment graph. In aspects, the training dataset may comprise aggregated user response data (e.g., user response data aggregated using user response aggregating module 136).

Model generating module 140 may be configured to generate one or more models for predicting image performance based, at least in part, on the resonance value and the confidence score for each image of the collection of images. In aspects, the generated models may include one or more of a general audience model, a social media model, a stock images model, an interest-based model, an audience segment or audience cohort model, a context model, and/or a segment model.

Candidate image receiving module 142 may be configured to receive a plurality of candidate images for a creative campaign. In aspects, candidate image receiving module 142 may be configured to receive the plurality of candidate images from one or more sources. In aspects, the one or more sources may include, by way of non-limiting examples, social media platforms, websites, image group boards or forums, stock image sites, and the like.

Metrics determining module 144 may be configured to determine, using at least one model of the one or more models, a first set of metrics for each candidate image of the plurality of candidate images. In aspects, the first set of metrics for each candidate image of the plurality of candidate images may include a candidate image resonance value. In aspects, the first set of metrics for each candidate image of the plurality of candidate images may include a candidate image confidence score in a candidate image resonance value. In aspects, one or both of the candidate image resonance value and the candidate image confidence score may be determined using a ranking algorithm. In aspects, the ranking algorithm may be the skill-based ranking system.

Displaying module 146 may be configured to cause display of a listing of the plurality of candidate images. In aspects, the listing may include an identifier for each candidate image of the plurality of candidate images. In aspects, the listing may include the first set of metrics for each of the plurality of candidate images (e.g., the first set of metrics determined using the metrics determining module 144).

Advertisement performance data receiving module 148 may be configured to receive advertisement performance data for a plurality of advertisements. In aspects, one or more advertisements of the plurality of advertisements may display an image from the collection of images. In aspects, one or more advertisements of the plurality of advertisements may display an image from the plurality of candidate images.

Aggregate score determining module 150 may be configured to determine, for each image displayed in an advertisement, an aggregate score for the image and/or the advertisement. In aspects, the aggregate score may be based, at least in part, on the resonance value for the image. In aspects, the aggregate score may be based, at least in part, on the confidence score in the resonance value for the image.

Comparing module 152 may be configured to compare, for each image displayed in an advertisement, a respective aggregate score and respective advertisement performance data.

Model validating module 154 may be configured to validate the one or more models for predicting image performance based, at least in part, on comparing the respective aggregate score and advertisement performance data.

Attribute determining module 156 may be configured to identify one or more attributes for at least a portion of the images from the collection of images. In aspects, the one or more attributes may include one or more of pixel related information, stylistic information, an image vector, keyword metadata or tags, and/or labels based on human subjective preferences. In aspects, attribute determining module 156 may be configured to determine one or more attributes for at least a portion of the plurality of candidate images.

Image grouping module 158 may be configured to group collections of images into one or more groups based, at least in part, on the resonance values determined from the user responses.

Average attribute determining module 160 may be configured to determine an average of attributes for one or more groups of a collection of images based, at least in part, on one or more attributes for each image in each group.

Similarity vector determining module 162 may be configured to determine a similarity vector for at least a portion of a plurality of candidate images by comparing one or more attributes for each candidate image with the average of attributes for each group (e.g., as determined by the average attribute determining module 160).

Label assigning module 164 may be configured to train a machine learning algorithm to label each candidate image of the plurality of candidate images with the respective candidate image predicted resonance value. In aspects, the machine learning algorithm may be trained using the generated training dataset. In aspects, label assigning module 164 may be configured to assign one or more labels to at least a portion of the plurality of candidate images based, at least in part, on the determined similarity vector. In aspects, the plurality of labels may include the candidate image predicted resonance value and the candidate image predicted confidence score for each at least a portion of the plurality of candidate images.

In some implementations, computing platform(s) 110, remote platform(s) 112, and/or external resources 166 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 166 may be operatively linked via some other communication media.

A given remote platform 112 may include one or more processors configured to execute computer program modules. The computer program modules may be configured to enable an expert or user associated with the given remote platform 112 to interface with system 100 and/or external resources 166, and/or provide other functionality attributed herein to remote platform(s) 112. By way of non-limiting example, a given remote platform 112 and/or a given computing platform 110 may include one or more of a server, a desktop computer, a laptop computer, a handheld computer, a tablet computing platform, a NetBook, a Smartphone, a gaming console, and/or other computing platforms.

External resources 166 may include sources of information outside of system 100, external entities participating with system 100, and/or other resources. In some implementations, some or all of the functionality attributed herein to external resources 166 may be provided by resources included in system 100.

Computing platform(s) 110 may include electronic storage 168, one or more processors 170, and/or other components. Computing platform(s) 110 may include communication lines, or ports to enable the exchange of information with a network and/or other computing platforms. Illustration of computing platform(s) 110 in FIG. 1 is not intended to be limiting. Computing platform(s) 110 may include a plurality of hardware, software, and/or firmware components operating together to provide the functionality attributed herein to computing platform(s) 110. For example, computing platform(s) 110 may be implemented by a cloud of computing platforms operating together as computing platform(s) 110.

Electronic storage 168 may comprise non-transitory storage media that electronically stores information. The electronic storage media of electronic storage 168 may include one or both of system storage that is provided integrally (e.g., substantially non-removable) with computing platform (s) 110 and/or removable storage that is removably connectable to computing platform(s) 110 via, for example, a port (e.g., a USB port, a firewire port, etc.) or a drive (e.g., a disk drive, etc.). Electronic storage 168 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 168 may include one or more virtual storage resources (e.g., cloud storage, a virtual private network, and/or other virtual storage resources). Electronic storage 168 may store software algorithms, information determined by processor(s) 170, information received from computing platform(s) 110, information received from remote platform(s) 112, and/or other information that enables computing platform(s) 110 to function as described herein.

Processor(s) 170 may be configured to provide information processing capabilities in computing platform(s) 110. As such, processor(s) 170 may include one or more of a digital processor, an analog processor, a digital circuit designed to process information, an analog circuit designed to process information, a state machine, and/or other mechanisms for electronically processing information. Although processor(s) 170 is shown in FIG. 1 as a single entity, this is for illustrative purposes only. In some implementations, processor(s) 170 may include a plurality of processing units. These processing units may be physically located within the same device, or processor(s) 170 may represent processing functionality of a plurality of devices operating in coordination. Processor(s) 170 may be configured to execute modules 116, 118, 120, 122, 124, 126, 128, 130, 132, 134, 136, 138, 140, 142, 144, 146, 148, 150, 152, 154, 156, 158, 160, 162, and/or 164, and/or other modules. Processor(s) 170 may be configured to execute modules 116, 118, 120, 122, 124, 126, 128, 130, 132, 134, 136, 138, 140, 142, 144, 146, 148, 150, 152, 154, 156, 158, 160, 162, and/or 164, and/or other modules by software; hardware; firmware; some combination of software, hardware, and/or firmware; and/or other mechanisms for configuring processing capabilities on processor(s) 170. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 116, 118, 120, 122, 124, 126, 128, 130, 132, 134, 136, 138, 140, 142, 144, 146, 148, 150, 152, 154, 156, 158, 160, 162, and/or 164 are illustrated in FIG. 1 as being implemented within a single processing unit, in implementations in which processor(s) 170 includes multiple processing units, one or more of modules 116, 118, 120, 122, 124, 126, 128, 130, 132, 134, 136, 138, 140, 142, 144, 146, 148, 150, 152, 154, 156, 158, 160, 162, and/or 164 may be implemented remotely from the other modules. The description of the functionality provided by the different modules 116, 118, 120, 122, 124, 126, 128, 130, 132, 134, 136, 138, 140, 142, 144, 146, 148, 150, 152, 154, 156, 158, 160, 162, and/or 164 described below is for illustrative purposes, and is not intended to be limiting, as any of modules 116, 118, 120, 122, 124, 126, 128, 130, 132, 134, 136, 138, 140, 142, 144, 146, 148, 150, 152, 154, 156, 158, 160, 162, and/or 164 may provide more or less functionality than is described. For example, one or more of modules 116, 118, 120, 122, 124, 126, 128, 130, 132, 134, 136, 138, 140, 142, 144, 146, 148, 150, 152, 154, 156, 158, 160, 162, and/or 164 may be eliminated, and some or all of its functionality may be provided by other ones of modules 116, 118, 120, 122, 124, 126, 128, 130, 132, 134, 136, 138, 140, 142, 144, 146, 148, 150, 152, 154, 156, 158, 160, 162, and/or 164. As another example, processor(s) 170 may be configured to execute one or more additional modules that may perform some or all of the functionality attributed below to one of modules 116, 118, 120, 122, 124, 126, 128, 130, 132, 134, 136, 138, 140, 142, 144, 146, 148, 150, 152, 154, 156, 158, 160, 162, and/or 164.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 2:
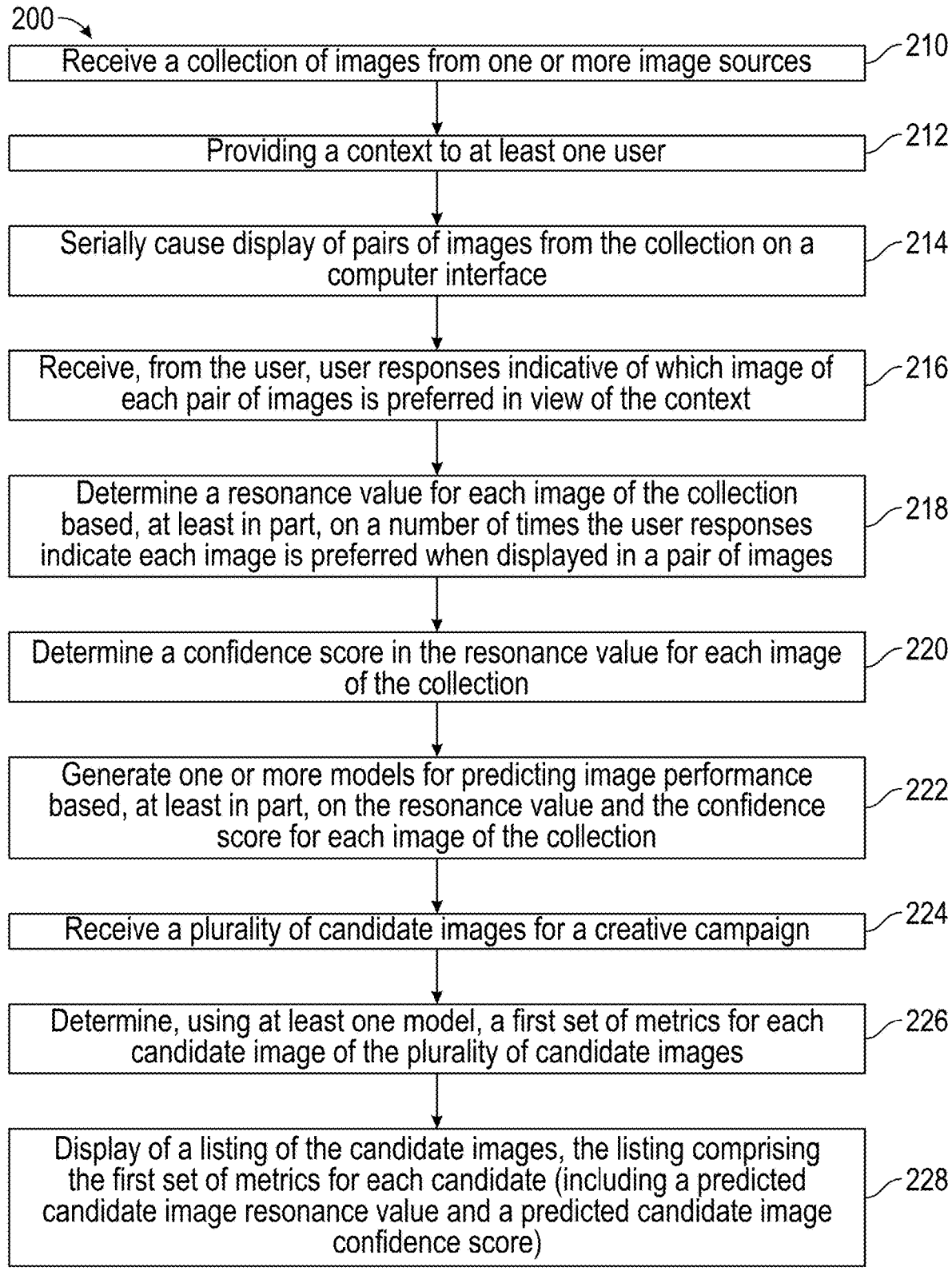
FIG. 2 illustrates an exemplary flow diagram for predicting performance of creative content (e.g., images, advertisements containing images, and/or advertising campaigns), according to certain aspects of the present disclosure.

With reference now to FIG. 2, illustrated is an exemplary flow diagram (e.g., process 200) for predicting performance of creative content, according to certain aspects of the disclosure. For explanatory purposes, the exemplary process 200 is described herein with reference to FIG. 1. Further for explanatory purposes, the steps of the exemplary process 200 are described herein as occurring in serial, or linearly. However, multiple instances of the exemplary process 200 may occur in parallel.

At step 210, the process 200 may include receiving a collection of images from one or more image sources. In aspects, the one or more sources may include, by way of non-limiting examples, social media platforms, websites, image group boards or forums, stock image sites, and the like. In aspects, the collection of images may be identified using a context segment graph (e.g., context segment graph 600 of FIG. 6, more fully described below).

At step 212, the process 200 may include providing a context to at least one user. In aspects, the context may be provided to the user via display of a context identifier (e.g., a word, a combination of words, a question, or the like) on a computer interface. In aspects, the context may be derived from information pertaining to a node in a context segment graph.

At step 214, the process 200 may include serially or sequentially causing display of pairs of images from the collection of images on a computer interface. In aspects, pairs of images may be displayed side-by-side or one above the other on the computer interface. In aspects, pairs of images may be displayed on a computer interface for a finite period of time (e.g., ten seconds) or until a user response is received.

At step 216, the process 200 may include receiving, from the at least one user, user responses indicative of which image of each pair of images displayed on the computer interface is preferred in view of the context.

At step 218, the process 200 may include determining, using a ranking algorithm (e.g., the skill-based ranking system), a resonance value for at least a portion of the images of the collection of images based, at least in part, on a number of times the user responses indicate each image is preferred when displayed in a pair of images.

At step 220, the process 200 may include determining, using the ranking algorithm, a confidence score in the resonance value for at least a portion of the images of the collection of images.

At step 222, the process 200 may include generating one or more models for predicting image performance based, at least in part, on the resonance value and the confidence score for each image of the collection of images.

At step 224, the process 200 may include receiving a plurality of candidate images for a creative campaign.

At step 226, the process 200 may include determining, using at least one model of the one or more models, a first set of metrics for each candidate image of the plurality of candidate images.

At step 228, the process 200 may include causing display of a listing of the plurality of candidate images. In aspects, the listing may include the first set of metrics for each of the plurality of candidate images. In aspects, the first set of metrics for each candidate image may include at least one of a candidate image resonance value and a candidate image confidence score.

For example, as described above in relation to FIG. 1, at step 210, the process 200 may include receiving a collection of images from one or more image sources (e.g., through image receiving module 116 of the system 100 of FIG. 1). At step 212, the process 200 may include providing a context to at least one user (e.g., through context providing module 124 of the system 100 of FIG. 1). At step 214, the process 200 may include serially or sequentially causing display of pairs of images from the collection of images on a computer interface (e.g., through image pair displaying module 128 of the system 100 of FIG. 1). At step 216, the process 200 may include receiving, from the at least one user, user responses indicative of which image of each pair of images displayed on the computer interface is preferred in view of the context (e.g., through user response receiving module 130 of the system 100 of FIG. 1). At step 218, the process 200 may include determining, using a ranking algorithm, a resonance value for at least a portion of the images of the collection of images based, at least in part, on a number of times the user responses indicate each image is preferred when displayed in a pair of images (e.g., through resonance value determining module 132 of the system 100 of FIG. 1). At step 220, the process 200 may include determining, using the ranking algorithm, a confidence score in the resonance value for at least a portion of the images of the collection of images (e.g., through confidence score determining module 134 of the system 100 of FIG. 1). At step 222, the process 200 may include generating one or more models for predicting image performance based, at least in part, on the resonance value and the confidence score for each image of the collection of images (e.g., through model generating module 140 of the system 100 of FIG. 1). At step 224, the process 200 may include receiving a plurality of candidate images for a creative campaign (e.g., through candidate image receiving module 142 of the system 100 of FIG. 1). At step 226, the process 200 may include determining, using at least one model of the one or more models, a first set of metrics for each candidate image of the plurality of candidate images (e.g., through metrics determining module 144 of the system 100 of FIG. 1). At step 228, the process 200 may include causing display of a listing of the plurality of candidate images (e.g., through displaying module 146 of the system 100 of FIG. 1).

Figure 3:
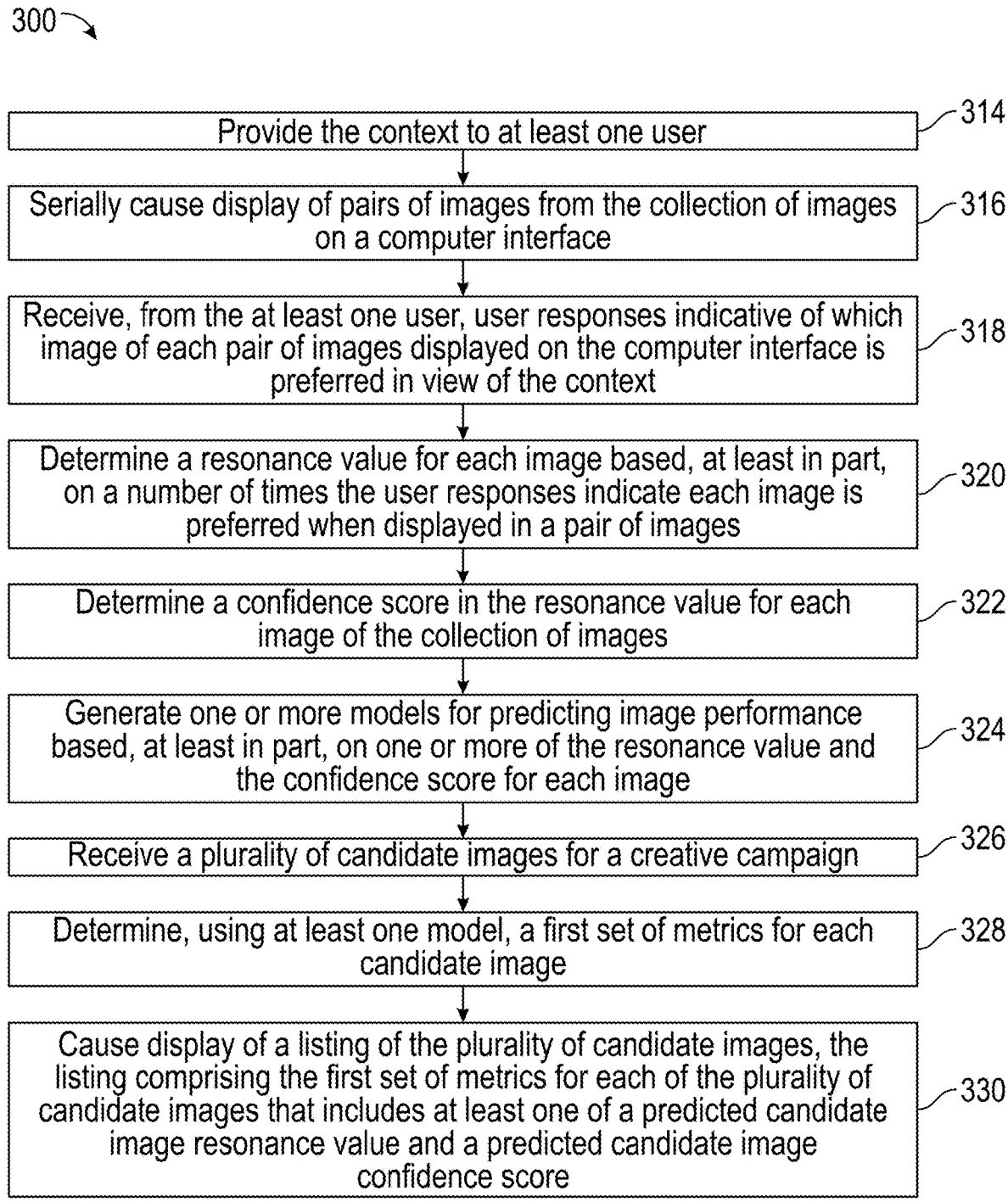
FIG. 3 illustrates an exemplary flow diagram for predicting performance of creative content (e.g., images, advertisements containing images, and/or advertising campaigns), according to certain aspects of the present disclosure.

Turning to FIG. 3, illustrated is an exemplary flow diagram (e.g., process 300) for predicting performance of creative content, according to certain aspects of the disclosure. For explanatory purposes, the exemplary process 300 is described herein with reference to FIG. 1. Further for explanatory purposes, the steps of the exemplary process 300 are described herein as occurring in serial, or linearly. However, multiple instances of the exemplary process 300 may occur in parallel.

At step 314, the process 300 may include providing the context to at least one user. In aspects, the context may be provided to the user via display of a context identifier (e.g., a word, a combination of words, a question, or the like) on a computer interface. In aspects, the context may be derived from information pertaining to a node in a context segment graph.

At step 316, the process 300 may include serially or sequentially causing display of pairs of images from the collection of images on a computer interface. In aspects, pairs of images may be displayed side-by-side or one above the other on the computer interface. In aspects, pairs of images may be displayed on a computer interface for a finite period of time (e.g., ten seconds) or until a user response is received.

At step 318, the process 300 may include receiving, from the at least one user, user responses indicative of which image of each pair of images displayed on the computer interface is preferred in view of the context.

At step 320, the process 300 may include determining, using a ranking algorithm (e.g., the skill-based ranking system), a resonance value for at least a portion of the images of the collection of images based, at least in part, on a number of times the user responses indicate each image is preferred when displayed in a pair of images.

At step 322, the process 300 may include determining, using the ranking algorithm (e.g., the skill-based ranking system), a confidence score in the resonance value for at least a portion of the images of the collection of images.

At step 324, the process 300 may include generating one or more models for predicting image performance based, at least in part, on the resonance value and the confidence score for each image of the collection of images.

At step 326, the process 300 may include receiving a plurality of candidate images for a creative campaign.

At step 328, the process 300 may include determining, using at least one model of the one or more models, a first set of metrics for each candidate image of the plurality of candidate images.

At step 330, the process 300 may include causing display of a listing of the plurality of candidate images. In aspects, the listing may include the first set of metrics for each of the plurality of candidate images. In aspects, the first set of metrics for each candidate image may include at least one of a candidate image resonance value and a candidate image confidence score.

For example, as described above in relation to FIG. 1. At step 314, the process 300 may include providing the context to at least one user (e.g., through context providing module 124 of the system 100 of FIG. 1). At step 316, the process 300 may include serially or sequentially causing display of pairs of images from the collection of images on a computer interface (e.g., through image pair displaying module 128 of the system 100 of FIG. 1). At step 318, the process 300 may include receiving, from the at least one user, user responses indicative of which image of each pair of images displayed on the computer interface is preferred in view of the context (e.g., through user response receiving module 130 of the system 100 of FIG. 1). At step 320, the process 300 may include determining, using a ranking algorithm, a resonance value for at least a portion of the images of the collection of images based, at least in part, on a number of times the user responses indicate each image is preferred when displayed in a pair of images (e.g., through resonance value determining module 132 of the system 100 of FIG. 1). At step 322, the process 300 may include determining, using the ranking algorithm, a confidence score in the resonance value for at least a portion of the images of the collection of images (e.g., through confidence score determining module 134 of the system 100 of FIG. 1). At step 324, the process 300 may include generating one or more models for predicting image performance based, at least in part, on the resonance value and the confidence score for each image of the collection of images (e.g., through model generating module 140 of the system 100 of FIG. 1). At step 326, the process 300 may include receiving a plurality of candidate images for a creative campaign (e.g., through candidate image receiving module 142 of the system 100 of FIG. 1). At step 328, the process 300 may include determining, using at least one model of the one or more models, a first set of metrics for each candidate image of the plurality of candidate images (e.g., through metrics determining module 144 of the system 100 of FIG. 1). At step 330, the process 300 may include causing display of a listing of the plurality of candidate images (e.g., through displaying module 146 of the system 100 of FIG. 1).

Figure 4:
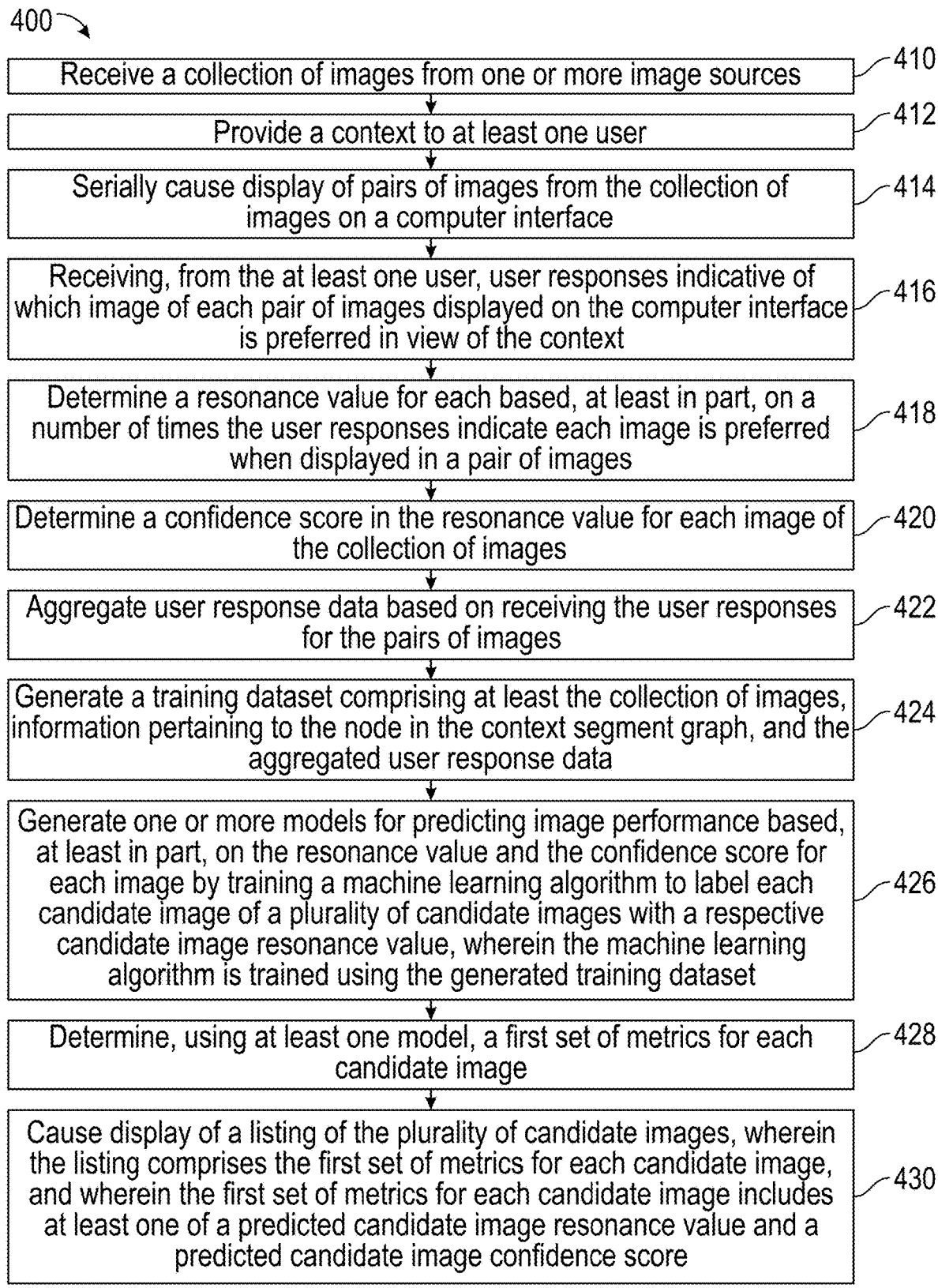
FIG. 4 illustrates an exemplary flow diagram for predicting performance of creative content (e.g., images, advertisements containing images, and/or advertising campaigns), according to certain aspects of the disclosure.

With reference to FIG. 4, illustrated is an exemplary flow diagram (e.g., process 400) for predicting performance of creative content, according to certain aspects of the disclosure. For explanatory purposes, the exemplary process 400 is described herein with reference to FIG. 1. Further for explanatory purposes, the steps of the exemplary process 400 are described herein as occurring in serial, or linearly. However, multiple instances of the exemplary process 400 may occur in parallel.

At step 410, the process 400 may include receiving a collection of images from one or more image sources. In aspects, the one or more sources may include, by way of non-limiting examples, social media platforms, websites, image group boards or forums, stock image sites, and the like. In aspects, the collection of images may be identified using a context segment graph (e.g., context segment graph 600 of FIG. 6, more fully described below).

At step 412, the process 400 may include providing a context to at least one user. In aspects, the context may be provided to the user via display of a context identifier (e.g., a word, a combination of words, a question, or the like) on a computer interface. In aspects, the context may be derived from information pertaining to a node in a context segment graph.

At step 414, the process 400 may include serially or sequentially causing display of pairs of images from the collection of images on a computer interface. In aspects, pairs of images may be displayed side-by-side or one above the other on the computer interface. In aspects, pairs of images may be displayed on a computer interface for a finite period of time (e.g., ten seconds) or until a user response is received.

At step 416, the process 400 may include receiving, from the at least one user, user responses indicative of which image of each pair of images displayed on the computer interface is preferred in view of the context.

At step 418, the process 400 may include determining, using a ranking algorithm (e.g., the skill-based ranking system), a resonance value for at least a portion of the images of the collection of images based, at least in part, on a number of times the user responses indicate each image is preferred when displayed in a pair of images.

At step 420, the process 400 may include determining, using the ranking algorithm (e.g., the skill-based ranking system), a confidence score in the resonance value for at least a portion of the images of the collection of images.

At step 422, the process 400 may include aggregating user response data based on receiving the user responses for the pairs of images from the collection of images.

At step 424, the process 400 may include generating a training dataset. In aspects, the training dataset may comprise the collection of images. In aspects, the training dataset may comprise information pertaining to the node in the context segment graph. In aspects, the training dataset may comprise aggregated user response data.

At step 426, the process 400 may include generating one or more models for predicting image performance based, at least in part, on the resonance value and the confidence score for each image of the collection of images by training a machine learning algorithm to label each candidate image of a plurality of candidate images with a respective candidate image resonance value, wherein the machine learning algorithm is trained using the generated training dataset.

At step 428, the process 400 may include determining, using at least one model of the one or more models, a first set of metrics for each candidate image of the plurality of candidate images.

At step 430, the process 400 may include causing display of a listing of the plurality of candidate images. In aspects, the listing may include the first set of metrics for each of the plurality of candidate images. In aspects, the first set of metrics for each candidate image may include at least one of a candidate image resonance value and a candidate image confidence score.

For example, as described above in relation to FIG. 1, at step 410, the process 400 may include receiving a collection of images from one or more image sources (e.g., through image receiving module 116 of the system 100 of FIG. 1). At step 412, the process 400 may include providing a context to at least one user. In aspects, the context may be provided to the user via display of a context identifier on a computer interface (e.g., through context providing module 124 of the system 100 of FIG. 1). At step 414, the process 400 may include serially or sequentially causing display of pairs of images from the collection of images on a computer interface (e.g., through image pair displaying module 128 of the system 100 of FIG. 1). At step 416, the process 400 may include receiving, from the at least one user, user responses indicative of which image of each pair of images displayed on the computer interface is preferred in view of the context (e.g., through user response receiving module 130 of the system 100 of FIG. 1). At step 418, the process 400 may include determining, using a ranking algorithm, a resonance value for at least a portion of the images of the collection of images based, at least in part, on a number of times the user responses indicate each image is preferred when displayed in a pair of images (e.g., through resonance value determining module 132 of the system 100 of FIG. 1). At step 420, the process 400 may include determining, using the ranking algorithm, a confidence score in the resonance value for at least a portion of the images of the collection of images (e.g., through confidence score determining module 134 of the system 100 of FIG. 1). At step 422, the process 400 may include aggregating user response data based on receiving the user responses for the pairs of images from the collection of images (e.g., through user response aggregating module 136 of the system 100 of FIG. 1). At step 424, the process 400 may include generating a training dataset comprising at least the collection of images, information pertaining to the node in the context segment graph, and the aggregated user response data (through training dataset generating module 138 of the system 100 of FIG. 1). At step 426, the process 400 may include generating one or more models for predicting image performance based, at least in part, on the resonance value and the confidence score for each image of the collection of images by training a machine learning algorithm to label each candidate image of a plurality of candidate images with a respective candidate image resonance value, wherein the machine learning algorithm is trained using the generated training dataset (e.g., through model generating module 140 of the system 100 of FIG. 1). At step 428, the process 400 may include determining, using at least one model of the one or more models, a first set of metrics for each candidate image of the plurality of candidate images (e.g., through metrics determining module 144 of the system 100 of FIG. 1). At step 430, the process 400 may include causing display of a listing of the plurality of candidate images (e.g., through displaying module 146 of the system 100 of FIG. 1).

Figure 5:
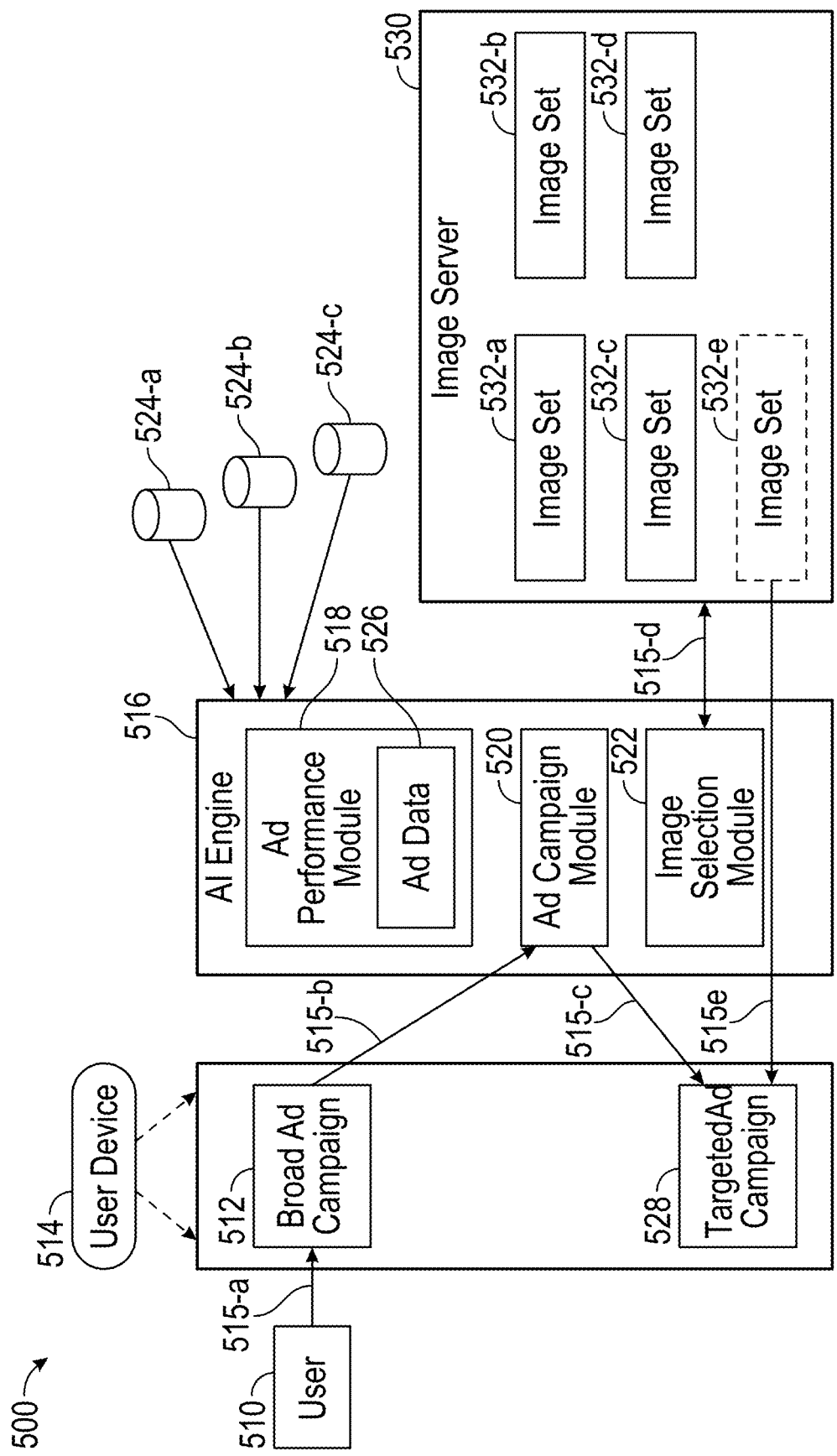
FIG. 5 illustrates a process flow for predicting performance of creative content (e.g., images, advertisements containing images, and/or advertising campaigns), according to certain aspects of the disclosure.

Turning to FIG. 5, illustrated is a process flow 500 for predicting performance of creative content (e.g., images, advertisements containing images, and/or advertising campaigns), in accordance with one or more implementations of the present disclosure. In some cases, process flow 500 implements one or more aspects of the figures descried herein, including at least FIG. 1. In some examples, process flow 500 may be implemented by an image recommendation system, such as system 100, or any of systems 700, 800, or 900.

In some cases, a user 510 may initiate (e.g., 515-a) a broad ad campaign 512 for an entity (e.g., a company or organization, a brand) from a user device 514. The user device 514 may be similar or substantially similar to the remote computing platform(s) 112 described in relation to FIG. 1. In this example, the ad campaign 512 may be broadly targeted to a general audience, irrespective of any interests, demographics, geographical location, age, etc. In some cases, the user device 514 may be one of electronically, logistically, and communicatively coupled to an AI engine 516. The AI engine 516 may be executed or hosted on a server, such as computing platform(s) 110 in FIG. 1. Additionally, or alternatively, the AI engine 516 may be one of electronically, logistically, and communicatively coupled to the computing platform(s) 110. In some cases, the AI engine 516 may be embodied using hardware, software, or a combination thereof. As seen, the AI engine 516 comprises an ad performance module 518, an ad campaign module 520, and an image selection module 522. The modules (i.e., ad performance module 518, ad campaign module 520, and image selection module 522) may implement one or more aspects of the modules previously described in relation to FIG. 1. Further, the modules in FIG. 5 may be embodied using hardware, software, or a combination thereof.

In some cases, the user 510 running the broad ad campaign 512 may utilize the AI engine 516 for fine tuning the campaign, for instance, to enhance click-through-rates (CTR) and/or decrease cost-per-acquisition (CPA), to name a few metrics. The AI engine 516 may analyze data from numerous sources (e.g., shown as data sources 524-*a*, 524-*b*, 524-*c*) across the Internet to optimize ad campaign performance. In some cases, the AI engine 516 may scan and analyze datasets pertaining to ad impression opportunities and/or historical clearing prices across first-price auction environments, for instance, to choose an optimal bid for impressions and leverage audience insights to provide real-time recommendations, to name two non-limiting examples. In some examples, the AI engine 516 utilizes bid factors (e.g., a multiplier applied to a base bid to adjust the bid sent out to an ad exchange to focus on top-performing websites, geo locations, and/or recency). In other cases, the AI engine 516 may utilize line items, rather than bid factors, to determine an audience segment/cohort to focus on. In either case, the AI engine 516 may recommend specific audience segments for prioritizing ad spending on the user 510.

In some embodiments, the ad performance module 518 of the AI engine 516 may receive ad data 526 from the plurality of data sources 524. The ad campaign module 520 of the AI engine 516 may also receive information pertaining to the broad ad campaign 512 from the user device 514 when the user 510 initiates 515-*a* the broad ad campaign 512. In some cases, the information may include an indication of a brand or company name, and/or a segment category (e.g., fitness, food, fashion, travel, etc.) to name two non-limiting examples. For instance, if the user 510 is running the broad ad campaign 512 for a fitness brand, the information may include the name of the brand and/or the segment category (e.g., fitness). In some examples, the AI engine 516 may analyze the ad data 526 received from the plurality of data sources 524 and the information pertaining to the broad ad campaign 512 to provide a recommendation 515-*b* for a targeted ad campaign. As seen, the ad campaign module 520 may transmit a message (e.g., 515-*c*) to the user device 514, where the message includes the recommendation for the targeted ad campaign 528. As an example, a user 510 running a broad ad campaign 512 for an outdoor and fitness brand may determine that "people who enjoy running" are responding well to the broad campaign 512 based on the analysis and recommendation provided by the AI engine 516. In this case, the user 510 may determine that a targeting ad campaign 528 focusing specifically on runners may serve to optimize ad performance (e.g., reduce cost-per-acquisition (CPS), reduce cost-per-click (CPC), increase revenue of organization, increase net income, etc.).

In some examples, the user 510 may also utilize the AI engine 516 to receive image recommendations for running the targeted ad campaign 528. In some embodiments, the AI engine 516 may be used to identify optimized image(s) to use in the targeted ad campaign 528, for instance, based on aggregating and analyzing human resonance data. The AI engine 516 may classify and label images (e.g., candidate advertising images) from one or more sources (e.g., social media, websites, image group boards or forums, stock image sites, etc.) based on their predicted performance with the difference audience or focus groups. For instance, the AI engine 516 may be used to predict image performance for a "people who enjoy running" audience segment, since running enthusiasts are responding well to the broad campaign 512. In some embodiments, after receiving a plurality of candidate images from one or more image sources (e.g., image collections 532-*a* through e, image collections uploaded by the user, images from other websites or social media, royalty-free or stock images, etc.), the AI engine 516 may run one or more models, for instance, an advertising score model. In some examples, different types of models may be utilized based on the target audience, audience segment or cohort, etc. For instance, a "health and fitness" audience model or a "running" model may be used to shortlist an image or subset of images that users from a "health and fitness" or "running" audience group might find more appealing given a certain context, such as "treadmills." In other words, given an image or set of images, what would a person (e.g., general audience, social media user, particular interests user, etc.) think of said image (or set of images) in a specific context?

In some cases, the AI engine 516 may comprise the image selection module 522, which may be in communication with an image server 530 over a bi-directional communication link (e.g., 515-*d*). In some cases, the image server 530 may store or receive a plurality of image collections (e.g., image collection 532-*a*, image collection 532-*b*, image collection 532-*c*, image collection 532-*d*, image collection 532-*e*, etc.) from one or more image sources, where each image collection includes at least one image. The image selection module 522 may analyze the plurality of images from the plurality of image collections 532-*a*, 532-*b*, 532-*c*, 532-*d*, 532-*e* and determine optimized image(s) for use in the targeted ad campaign 528. In some cases, after determining the optimizing image(s) for use in the targeted campaign 528, at least one image from the optimized image(s) (e.g., from image collection 532-*e*) may be uploaded 515-*e* for the targeted ad campaign 528.

Figure 6:
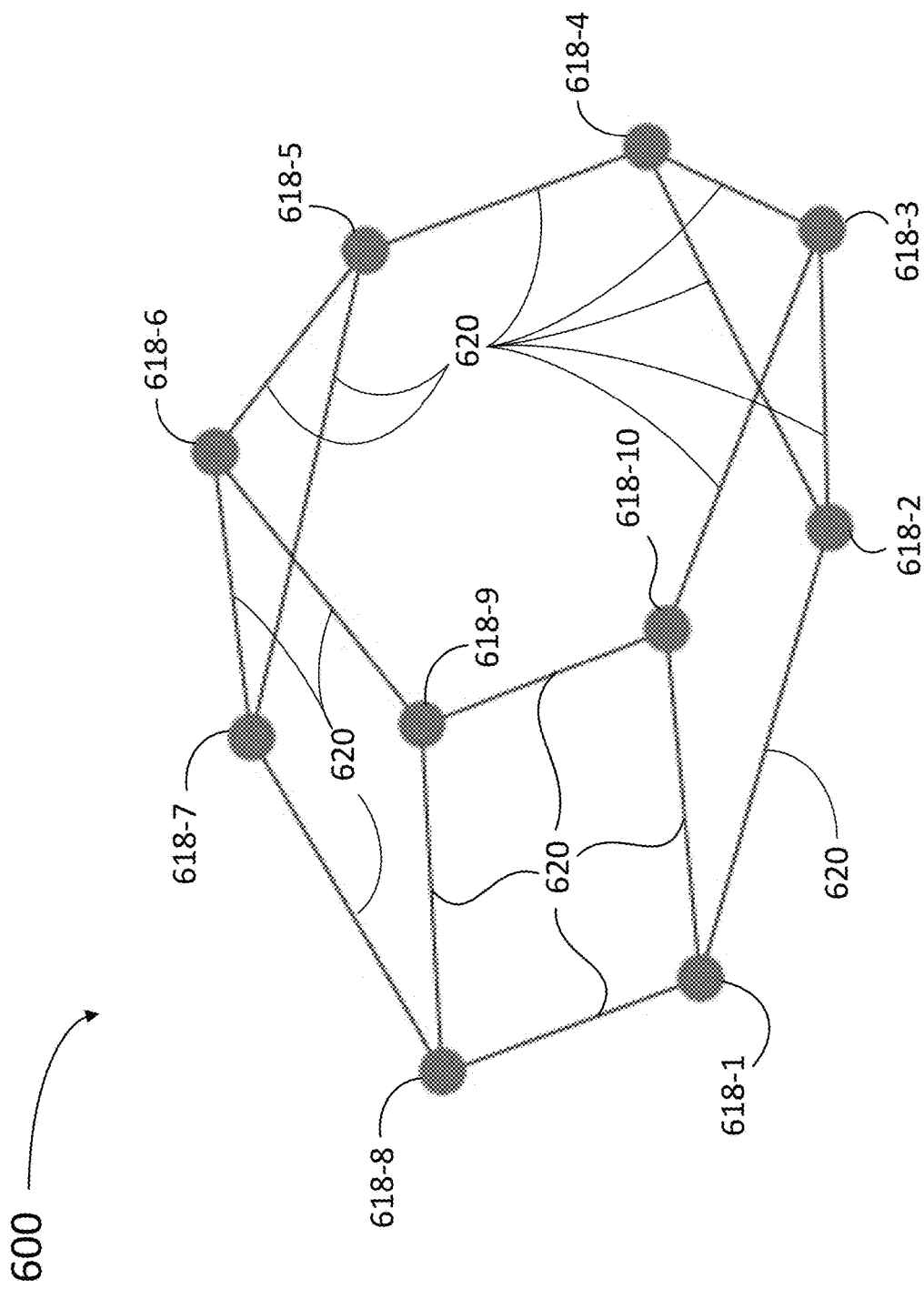
FIG. 6 illustrates an exemplary context segment graph, according to certain aspects of the disclosure.

Turning now to FIG. 6, which is a simplified illustration of a context segment graph 600, in accordance with various aspects of the disclosure. Context segment graph includes nodes 618-1, 618-2, 618-3, 618-4, 618-5, 618-6, 618-7, 618-8, 618-9 and 618-10 (hereinafter, collectively referred to as "nodes 618"). Each one of nodes 618 is an image that is generally related to each one of the other images in nodes 618 by a context, such as a common interest within an audience segment, or any other market or group segmentation, as disclosed herein. Context segment graph 600 has the characteristic that nodes 618 are connected pairwise such that each node 618 has at least one edge connecting it to another node 618.

To generate context segment graph 600, the system first selects a plurality of images or nodes 618 within a segment (e.g., having a common theme or target audience), and then generates a network that connects all of nodes 618 with links 620. The resulting context segment graph 600 may satisfy specific criteria. For example, the criteria may include that all the nodes in graph 600 are connected to the same number of links (3, in this case). This criterion may be referred to as a balanced graph criterion. In some embodiments, the criterion may include avoiding formation of "clusters" with interconnected nodes 618, separated by low connectivity nodes 618.

Once graph 600 is formed, then the pairs of images selected for display to a user in methods as disclosed herein (cf. steps 216, 316, and 414) may include any one or more, or all, of the pairs of nodes 618 that are separated by a single link 620 (e.g., nodes 618-1 and 618-2) in graph 600.

Figure 7:
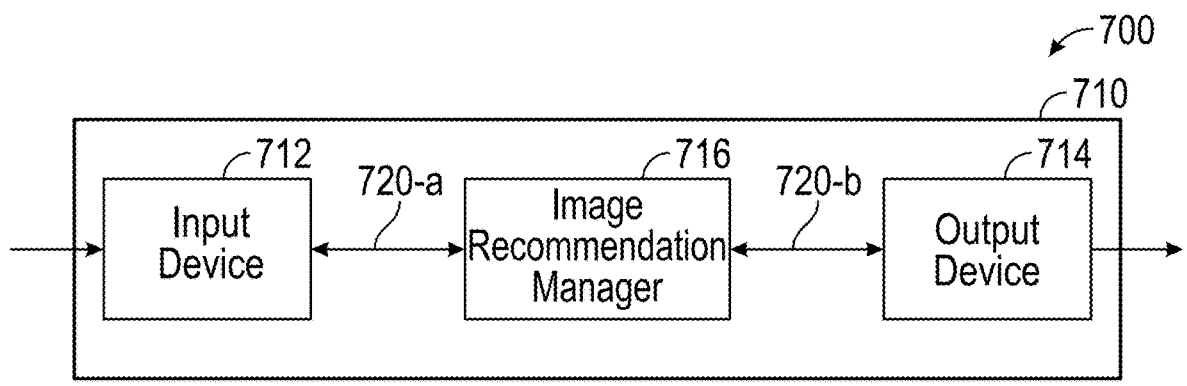
FIG. 7 illustrates a block diagram of a computing platform that supports classification of images using labels based on human subjective preferences for enhancing creative performance, according to certain aspects of the disclosure.

FIG. 7 shows a block diagram 700 of a computing platform 710 that supports subjective classification of images using labels based on human subjective preferences for enhancing creative performance, according to embodiments of the present disclosure. Computing platform 710 may be similar or substantially similar to the computing platform or server 110 previously described in relation to FIG. 1. In some examples, computing platform 710 also implements one or more aspects of the computing platform (s) 810, further described below in relation to FIG. 8. Computing platform 710 may include an input device 712, an output device 714, and an image recommendation manager 716. Computing platform 710 may also include a processor (e.g., shown as processor 170 in FIG. 1). Each of these components may be in communication with one another (e.g., via one or more buses 720, such as bus 720-*a* and bus 720-*b*). In some examples, computing platform or server 710 may include components for bi-directional voice and data communications including components for transmitting and receiving communications, a memory (e.g., shown as electronic storage 168 in FIG. 1), a software (e.g., shown as machine-readable instructions 114 in FIG. 1), a transceiver, an optional antenna, and an I/O controller. Computing platform or server 710 may communicate through wired or wireless means with one or more user devices, an image server, and/or an ad targeting server, to name a few non-limiting examples. In some implementations, computing platform 710, user devices, image server, and/or ad targeting server may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform 710, user devices, image servers, and/or ad targeting servers may be operatively linked via some other communication media.

Input device 712 may receive information such as packets (e.g., images from one or more image sources, such as image server 530 in FIG. 5; a context segment graph, etc.), user response data (e.g., from one or more user devices or remote computing platforms, such as remote computing platforms 112 of FIG. 1), or any other relevant information. In some cases, information received by the input device 712 may be passed on to other components of the computing platform 710. In some examples, the input device 712 may be an example of a transceiver.

Image recommendation manager 716 may implement one or more aspects of the image recommendation manager 816 described with reference to FIG. 8. Additionally, or alternatively, the image recommendation manager 716 may implement one or more aspects of the modules previously described in relation to FIGS. 1 and/or 5.

Image recommendation manager 716 and/or at least some of its various sub-components may be implemented in hardware, software executed by a processor, firmware, or any combination thereof. If implemented in software executed by a processor, the functions of the image recommendation manager 716 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some cases, the image recommendation manager 716 and/or at least some of its various sub-components may be physically located at various positions, including being distributed such that portions of functions are implemented at different physical locations by one or more physical devices. In some examples, image recommendation manager 716 and/or at least some of its various sub-components may be separate and distinct components in accordance with various aspects of the present disclosure. In other examples, image recommendation manager 716 and/or at least some of its various sub-components may be combined with one or more other hardware components, including but not limited to an I/0 component, a transceiver, a network server, another computing device, one or more other components described in the present disclosure, or a combination thereof in accordance with various aspects of the present disclosure.

Image recommendation manager 716 may receive a set of images from one or more sources. In some cases, the ad targeting system may be linked with the AI engine 516 in FIG. 5. In some embodiments, the image recommendation manager 716 may identify, from the collection of images, a subset of images related to a node in the context segment graph. Further, the image recommendation manager 716 may receive user responses for the subset of images, wherein the user responses are in context to the node in the context segment graph. In some cases, the user responses are received from at least one user, and each user response includes a resonance value and a confidence score for an image from the subset of images in context to the node. In some examples, the image recommendation manager 716 may generate one or more models for predicting image performance based on the user responses, further described in relation to FIG. 1. Image recommendation manager 716 may further receive a plurality of candidate images for a creative campaign. In some embodiments, image recommendation manager 716 may determine, using at least one model of the one or more models, a first set of metrics for each candidate image of the plurality of candidate images in context to the node. The first set of metrics for each candidate image includes at least a confidence score and a resonance value in context to the node. In some cases, the image recommendation manager 716 may display a listing of the plurality of candidate images, wherein the listing comprises the first set of metrics for each of the plurality of candidate images.

Output device 714 may transmit signals generated by other components of the device or computing platform 710. In some examples, the output device 714 may be collocated with the input device 712 in a transceiver module. For example, the output device 714 may include aspects of the transceiver. The output device 714 may include a single antenna, or it may include a set of antennas to communicate over a network. In other cases, the output device 714 may implement wired technology (e.g., ethernet).

Figure 8:
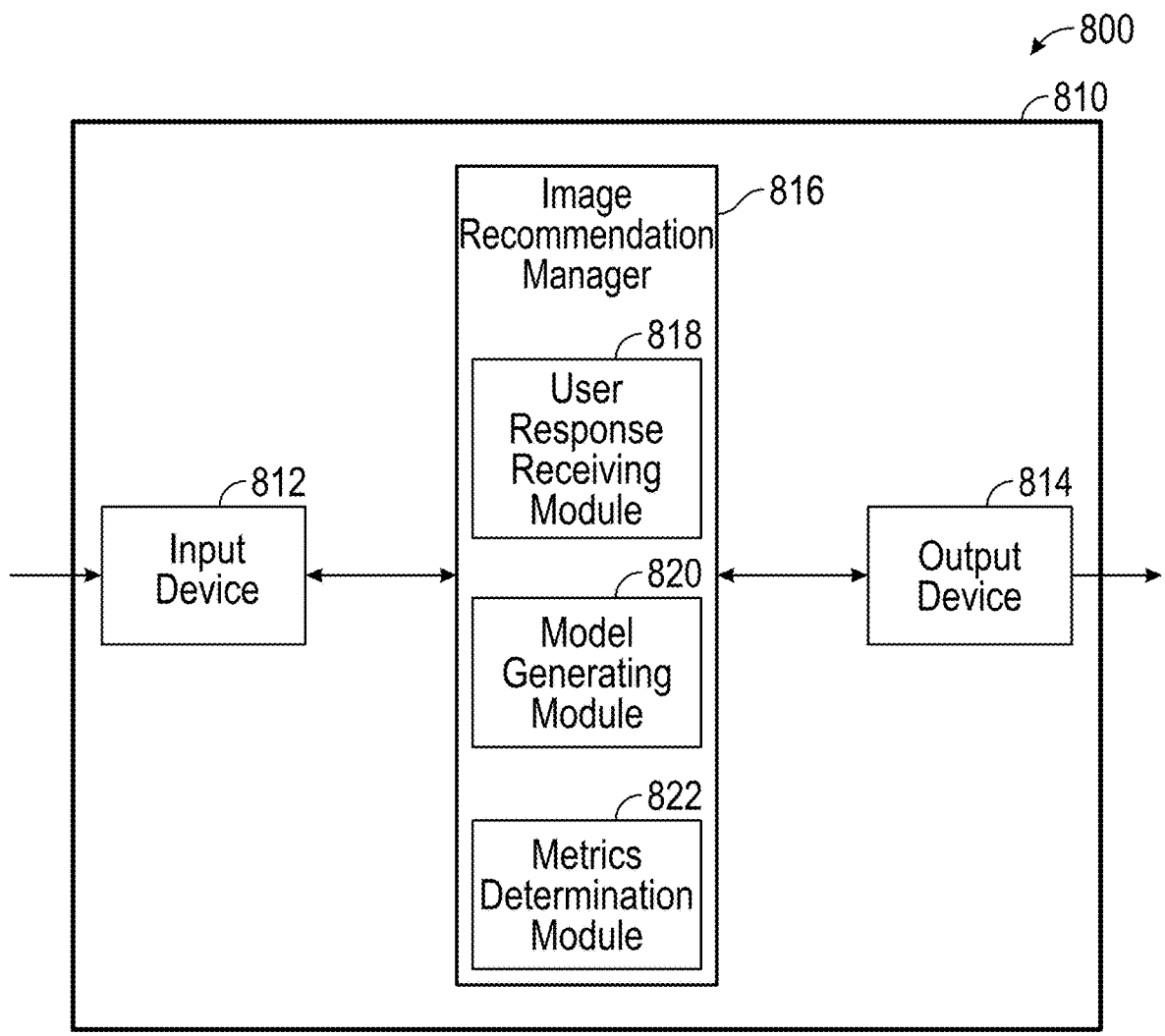
FIG. 8 illustrates a block diagram of a computing platform that supports classification of images using labels based on human subjective preferences for enhancing creative performance, according to certain aspects of the disclosure.

FIG. 8 shows a block diagram 800 of a computing platform 810 that supports subjective classification of images using labels based on human subjective preferences for enhancing creative performance, according to embodiments of the present disclosure. Computing platform 810 may be similar or substantially similar to the computing platform or server 110 previously described in relation to FIG. 1. In some examples, computing platform 810 also implements one or more aspects of the computing platform (s) 710 described in relation to FIG. 7. Computing platform 810 may include an input device 812, an output device 814, and an image recommendation manager 816. Computing platform 810 may also include a processor. Each of these components may be in communication with one another (e.g., via one or more buses). Image recommendation manager 816 may be similar or substantially similar to the image recommendation manager 716 previously described in relation to FIG. 7.

Input device 812 may receive information such as packets (e.g., images from one or more image sources, a context segment graph, etc.), user response data (e.g., from one or more user devices or remote computing platforms, such as remote computing platform(s) 112), or any other relevant information. In some cases, information received by the input device 812 may be passed on to other components of the computing platform 810. The input device 812 may be an example of a transceiver.

As seen, the image recommendation manager 816 comprises one or more modules, including a user response receiving module 818, a model generating module 820, and a metrics determination module 822.

In some cases, the computing platform 810 may access a context segment graph including one or more nodes or images for a given segment (e.g., context segment graph 600 shown in FIG. 6). By way of non-limiting example, the at least one segment may be selected from a group consisting of an interest-based segment, a business segment, or an audience segment. Additionally, or alternatively, in some examples, the context segment graph may be associated with one or more segment categories, including, but not limited to, fashion, fitness, food, business, creative, real estate, beauty, medical, consumer goods, travel, outdoors, home services, etc. Other segment categories known in the art are contemplated in different embodiments and the examples listed herein are not intended to be limiting.

Further, the computing platform 810 may receive a collection of images from one or more image sources. In some embodiments, the collection of images may be received from one or more image servers, such as image server 530 in FIG. 5. Remote computing platform(s) 112 may be one non-limiting example of an image server. In some cases, the collection of images may be received at the input device 812.

In some cases, the image recommendation manager 816 identifies, from the collection of images in a context segment graph (e.g., context segment 600 in FIG. 6). Further, user response receiving module 818 may receive one or more user responses for the subset of images. The one or more user responses may be in context to the node in the context segment graph. Further, the one or more user responses may be received from at least one user. In some examples, each user response may include a resonance value and a confidence score for an image from the subset of images in context to the node. In some cases, the user responses may be received from at least one user device (e.g., remote computing platform(s) 112 of FIG. 1) associated with the at least one user. The user responses may be received from the input device 812, for instance.

In some cases, the image recommendation manager 816 may aggregate human responsiveness data to an image subset in the context segment graph 600. As described above, potential audience members (e.g., social media users, e-commerce or online shopping users, general internet users, etc.) may be asked for their feedback on an image (or subset of images) given a context. Further, their feedback may be input into a machine learning (ML) model generated by an artificial intelligence (AI) algorithm. Utilizing feedback from a larger number of potential users may allow the AI algorithm to gain some level of scale out of the input data. In other words, feedback received from a large number of potential audience members may serve to ensure that the images used in an advertising campaign are an adequate representation of them as a whole, as well as different subgroups within them. In some cases, the user responses may include image preferences for an image when the image is presented in a pairwise image comparison. In some cases, the user responses may be utilized to determine a resonance value, e.g., using a ranking algorithm. In some cases, the user responses may be utilized to determine a confidence score for a resonance value. In some cases, the responses may be collected from random potential audience members.

In other cases, the responses may be collected from potential audience members falling into a particular segment or audience cohort (e.g., having a particular interest).

It should be noted that the image recommendation manager 816 may collect user responses for multiple nodes and/or segments in the context segment graph 600. The user responses (e.g., preference of images in pairwise comparisons of images related to the node(s)) may be used to generate one or more models, such as an advertising score model. In some examples, different types of advertising score models may be utilized based on the target audience, audience group, focus group, etc. For instance, a social media model may be used to predict how an image may fare (e.g., with regards to user engagement) when displayed to an average social media user. A high-level of user engagement (e.g., a user clicking on a digital advertisement or hyperlink associated with the image) may correlate to increased advertising revenue, promotion, etc. for a brand or company. In some cases, user engagement with an image is not only subjective, i.e., since it is based on the user's tastes and preferences, but also context dependent. While two images, e.g., an image of a dolphin leaping out of the water and an image of a couple walking along the beach, may have aesthetic qualities, the first image may be a poor choice given the context "summer apparel brand" and the second image may be a poor choice given the context "dolphin/whale watching." Aspects of the present disclosure relate to subjective classification of images by a classifier or machine-learning algorithm, where the subjective classification is based on human response data collected for images from a training dataset given a context. Said another way, given an image or set of images, what would a person (e.g., general audience, social media user, particular interests user, etc.) think of said image (or set of images) in a given context? As described below, the computing platform 810 may classify and rank images (e.g., candidate images) from a wide variety of image sources (e.g., social media, websites, image group boards or forums, stock image sites, etc.) based on their predicted performance with the different audience or focus groups. It should be noted that, the candidate images may be different than the training dataset images used to generate the one or more scoring models.

In some examples, model generating module 820 may generate one or more models for predicting ad performance. Generating the one or more models for predicting image performance may include training a machine learning or another artificial intelligence algorithm to label a resonance value for at least one future candidate image given a context segment node. As used herein, the term "context segment node" may refer to a node in a context segment graph that is further associated with a context. For instance, a context segment graph may comprise a plurality of nodes and a plurality of segments, where each node is associated with at least one segment. In one non-limiting example, a context segment graph may comprise a "fashion" segment, a "fitness" segment, and a "food" segment. Further, a node related to "running" may be associated with each of those three segments. In one non-limiting example, a context segment node may comprise the "running" node given the context "sports apparel brand." In another non-limiting example, a context segment node may comprise the "running" node given the context "gym" or "treadmill brand." In some cases, the one or more models for predicting image performance may assign different resonance labels for candidate images for different context segment nodes, even though the context segment nodes may be associated with a common node, such as "running."

Metrics determination module 822 may determine, using at least one model of the one or more models, a resonance value, and optionally, a confidence score, for at least a portion of the candidate images.

Output device 814 may transmit signals generated by other components of the device or computing platform 810. In some examples, the output device 814 may be collocated with the input device 812 in a transceiver module. The output device 814 may include a single antenna, or it may include a set of antennas. In other cases, the output device 814 may implement wired technology (e.g., ethernet).

A processor, shown as processor 170 in FIG. 1, may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions (e.g., functions or tasks supporting image ranking). Memory, shown as electronic storage 168 in FIG. 1, may include random access memory (RAM) and read only memory (ROM). The memory may store computer-readable, computer-executable software including instructions that, when executed, cause the processor to perform various functions described herein. In some cases, the memory may contain, among other things, a basic input/output system (BIOS) which may control basic hardware and/or software operation such as the interaction with peripheral components or devices.

Software may include code to implement aspects of the present disclosure, including code to support subjective classification of images using labels based on human subjective preferences. Software may be stored in a non-transitory computer-readable medium such as system memory or other memory. In some cases, the software may not be directly executable by the processor but may cause a computer (e.g., when compiled and executed) to perform functions described herein.

A transceiver may communicate bi-directionally, via one or more antennas, wired, or wireless links. For example, the transceiver may represent a wireless transceiver and may communicate bi-directionally with another wireless transceiver. The transceiver may also include a modem to modulate the packets and provide the modulated packets to the antennas for transmission, and to demodulate packets received from the antennas.

An I/O controller may manage input and output signals for computing platform 810. The I/O controller may also manage peripherals not integrated into computing platform 810. In some cases, the I/O controller may represent a physical connection or port to an external peripheral. In some cases, the I/O controller may utilize an operating system such as iOS®, ANDROID®, MS-DOS®, MS-WINDOWS®, OS/2®, UNIX®, LINUX®, or another known operating system. In other cases, I/O controller may represent or interact with a modem, a keyboard, a mouse, a touchscreen, or a similar device. In some cases, the I/O controller may be implemented as part of a processor. In some cases, a user may interact with computing platform 810 via the I/O controller or via hardware components controlled by the I/O controller, such as input device 812.

Figure 9:
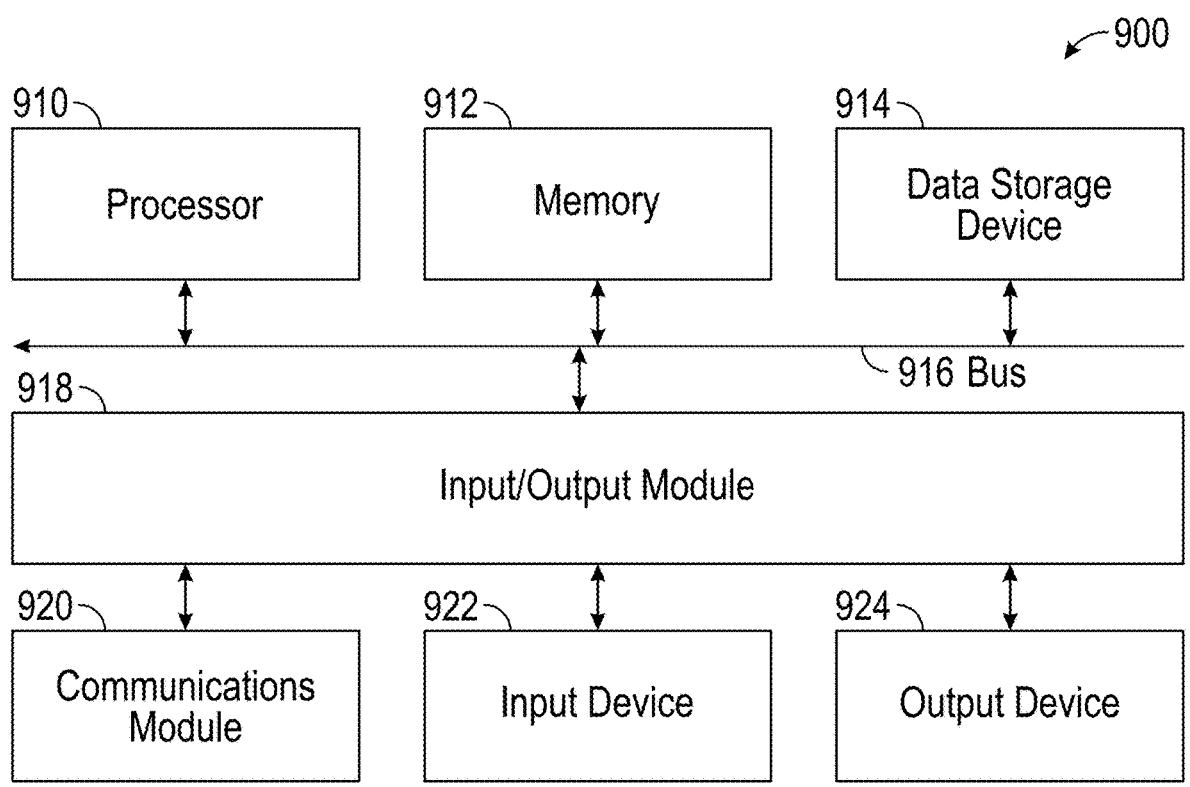
FIG. 9 is a block diagram illustrating an exemplary computer system (e.g., representing both client and server) with which aspects of the subject technology can be implemented.

With reference now to FIG. 9, shown is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

Computer system 900 (e.g., server and/or client) includes a bus 916 or other communication mechanism for communicating information, and a processor 910 coupled with bus 916 for processing information. By way of example, the computer system 900 may be implemented with one or more processors 910. Processor 910 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 912, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 916 for storing information and instructions to be executed by processor 910. The processor 910 and the memory 912 can be supplemented by, or incorporated in, special purpose logic circuitry.

The instructions may be stored in the memory 912 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 912 may also be used for storing temporary variable or other intermediate information during execution of instructions to be executed by processor 910.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 914 such as a magnetic disk or optical disk, coupled to bus 916 for storing information and instructions. Computer system 900 may be coupled via input/output module 918 to various devices. The input/output module 918 can be any input/output module. Exemplary input/output modules 918 include data ports such as USB ports. The input/output module 918 is configured to connect to a communications module 920. Exemplary communications modules 920 include networking interface cards, such as Ethernet cards and modems. In certain aspects, the input/output module 918 is configured to connect to a plurality of devices, such as an input device 922 and/or an output device 924. Exemplary input devices 922 include a keyboard and a pointing device, e.g., a mouse or a trackball, by which a user can provide input to the computer system 900. Other kinds of input devices 922 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 924 include display devices such as an LCD (liquid crystal display) monitor, for displaying information to the user.

According to one aspect of the present disclosure, the above-described gaming systems can be implemented using a computer system 900 in response to processor 910 executing one or more sequences of one or more instructions contained in memory 912. Such instructions may be read into memory 912 from another machine-readable medium, such as data storage device 914. Execution of the sequences of instructions contained in the main memory 912 causes processor 910 to perform the process steps described herein. One or more processors in a multi-processing arrangement may also be employed to execute the sequences of instructions contained in memory 912. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 910 for execution. Such a medium may take many forms, including, but not limited to, non-volatile media, volatile media, and transmission media. Non-volatile media include, for example, optical or magnetic disks, such as data storage device 914. Volatile media include dynamic memory, such as memory 912. Transmission media include coaxial cables, copper wire, and fiber optics, including the wires that comprise bus 916. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 900 reads data, information may be read from the game data and stored in a memory device, such as the memory 912. Additionally, data from the memory 912 servers accessed via a network the bus 916, or the data storage 914 may be read and loaded into the memory 912. Although data is described as being found in the memory 912, it will be understood that data does not have to be stored in the memory 912 and may be stored in other memory accessible to the processor 910 or distributed among several media, such as the data storage 914.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for predicting performance of creative content, the method comprising:
   receiving, by one or more modules of a predictive content performance system, a collection of images from one or more image sources;
   generating, based on the collection of images, a network graph, wherein each node of a plurality of nodes of the network graph represents an image of the collection of images, and wherein each link of a plurality of links of the network graph represents a context associating at least two nodes;
   providing, by the one or more modules of the predictive content performance system, the context to at least one user;
   serially causing display, by the one or more modules of the predictive content performance system, of pairs of images from the collection of images on a first computer interface, wherein the pairs of images are associated by the context;
   receiving, by the one or more modules of the predictive content performance system, from the at least one user, multiple user responses indicative of which image of each pair of images displayed on the first computer interface is preferred in view of the context;
   determining, using a ranking algorithm, a resonance value for each image of the collection of images based, at least in part, on a number of times the user responses indicate each image of the collection of images is preferred when displayed in a pair of images;
   generating a first similarity vector for each image of the collection of images by comparing at least a first attribute of each image with at least a second attribute of a subset of images of the collection of images, the first attribute including pixel data;
   generating, by the one or more modules of the predictive content performance system, a training dataset comprising at least the collection of images, the user responses, the resonance value for each image of the collection of images, and the first similarity vector for each image of the collection of images;
   generating, by the one or more modules of the predictive content performance system, based on the training dataset, one or more models for predicting image performance by training a machine learning algorithm to label each image of a plurality of images with a respective resonance value;
   providing, by the one or more modules of the predictive content performance system, to the one or more generated models, a plurality of candidate images for a creative campaign;
   determining, by the one or more generated models, a set of resonance values for the plurality of candidate images for the creative campaign; and
   causing display, by the one or more modules of the predictive content performance system, of a listing of the candidate images on a second computer interface, the listing comprising a resonance value of the set of resonance values for each candidate image of the plurality of candidate images.

2. The computer-implemented method of claim 1, wherein:
   the context is indicative of a segment selected from one of an interest segment, a business segment, or an audience segment;
   the network graph includes two or more nodes of the plurality of nodes connected by one or more of the plurality of links, each node of the two or more nodes associated with an image related to the segment; and
   serially causing display of the pairs of images comprises selecting the pairs of images from a first node and a second node in the network graph that are separated by one link.

3. The computer-implemented method of claim 1, wherein serially causing display of the pairs of images comprises:

selecting, from a database, two or more images associated with the context, the two or more images represented as two or more nodes of the network graph, each node having a same number of links joining the node with another node; and selecting a pair of images from a first node and a second node joined by a link.

4. The computer-implemented method of claim 1, further comprising:

aggregating user response data based on receiving the user responses for the pairs of images from the collection of images.

5. The computer-implemented method of claim 1, further comprising selecting the context from one or more categories selected from a group consisting of fashion, fitness, food, business, creative, real estate, beauty, medical, consumer goods, travel, outdoors, and home services.

6. The computer-implemented method of claim 1, wherein the one or more models comprise one or more of a general audience model, a social media model, a stock images model, an interests model, an audience segment or audience cohort model, a context model, and a segment model.

7. The computer-implemented method of claim 1, wherein generating the one or more models for predicting image performance comprises:

identifying one or more attributes for each image from the collection of images, wherein the one or more attributes include one or more of stylistic information, an image vector, keyword metadata or tags, and labels;

grouping the collection of images into one or more groups based on the resonance value from the user responses; and determining an average of attributes for each group of the one or more groups based at least in part on the one or more attributes for each image in each group.

8. The computer-implemented method of claim 1, further comprising:

determining one or more attributes for one or more of the plurality of candidate images;

determining a second similarity vector for each candidate image of the plurality of candidate images by comparing the one or more attributes for each candidate image of the plurality of candidate images with an attribute average for a subset of images of the plurality of candidate images; and assigning a plurality of labels to the candidate images, based on the second similarity vector.

9. The computer-implemented method of claim 1, further comprising:

receiving advertisement performance data for a plurality of advertisements, wherein each advertisement of the plurality of advertisements displays a candidate image from the plurality of candidate images;

determining, for each image displayed in an advertisement, an aggregate score based, at least in part, on the resonance value of the set of resonance values for each candidate image; and validating the one or more generated models for predicting image performance based, at least in part, on comparing the respective aggregate score and the respective advertisement performance data.

10. A system configured for predicting performance of creative content, the system comprising:

one or more hardware processors configured by multiple machine-readable instructions to:

generate, by one or more modules of a predictive content performance system, based on a collection of images, a network graph, wherein each node of a plurality of nodes of the network graph represents an image of the collection of images, and wherein each link of a plurality of links of the network graph represents a context associating at least two nodes;

access, by one or more modules of a predictive content performance system, the network graph;

provide, by one or more modules of a predictive content performance system, the context to at least one user;

serially cause display, by the one or more modules of the predictive content performance system, of pairs of images from the network graph, on a first computer interface, wherein the pairs of images are associated by the context;

receive, by the one or more modules of the predictive content performance system, from the at least one user, multiple user responses indicative of which image of each pair of images displayed on the first computer interface is preferred in view of the context;

determine, using a ranking algorithm, a resonance value for each image in the network graph based, at least in part, on a number of times the user responses indicate each image is preferred when displayed in a pair of images;

generate a first similarity vector for each image of the collection of images by comparing at least a first attribute of each image with at least a second attribute of a subset of images of the collection of images, the first attribute including pixel data;

generate, by the one or more modules of the predictive content performance system, a training dataset comprising at least the collection of images, the user responses, the resonance value for each image of the collection of images, and the first similarity vector for each image of the collection of images;

generate, by the one or more modules of the predictive content performance system, based on the training dataset, one or more models for predicting image performance by training a machine learning algorithm to label each image of a plurality of images with a respective resonance value;

provide, by the one or more modules of the predictive content performance system, to the one or more generated models, a plurality of candidate images for a creative campaign;

determine, by the one or more generated models, a set of resonance values for the plurality of candidate images for the creative campaign; and cause display, by one or more modules of the predictive content performance system, of a listing of the candidate images on a second computer interface, the listing comprising a resonance value of the set of resonance values for each candidate image of the plurality of candidate images.

11. The system of claim 10, wherein the context is selected from one of an interest segment, a business segment, and an audience segment.

12. The system of claim 10, wherein the one or more hardware processors are further configured by machine-readable instructions to:

aggregate user response data based on receiving the user responses for the pairs of images.

13. The system of claim 10, wherein the one or more hardware processors are configured by the machine-readable instructions to generate the one or more models for predicting image performance by:
  identifying one or more attributes for each image from the images in the network graph, wherein the one or more attributes include one or more of stylistic information, an image vector, keyword metadata or tags, and labels;
  grouping the images in the network graph into one or more groups based on the resonance value from the user responses; and
  determining an average of attributes for each group of the one or more groups based at least in part on the one or more attributes for each image in each group.

14. The system of claim 10, wherein the one or more hardware processors are configured by the machine-readable instructions to determine a first set of metrics for a one or more of the plurality of candidate images by:
  determining one or more attributes for each candidate image;
  determining a second similarity vector for each candidate image by comparing the one or more attributes for each candidate image with an attribute average for a subset of images of the plurality of candidate images; and
  assigning a plurality of labels to each candidate image based, at least in part, on the second similarity vector.

15. The system of claim 10, wherein the one or more hardware processors are further configured by machine-readable instructions to:
  receive advertisement performance data for a plurality of advertisements, wherein each advertisement of the plurality of advertisements displays a candidate image from the plurality of candidate images;
  determine, for each image displayed in an advertisement, an aggregate score based, at least in part, on the resonance value of the set of resonance values for each candidate image; and
  validate the one or more generated models for predicting image performance based, at least in part, on comparing the respective aggregate score and the respective advertisement performance data.

16. A non-transitory computer-readable storage medium having multiple instructions being executable by one or more processors to perform a method for predicting performance of creative content, the method comprising:
  receiving, by one or more modules of a predictive content performance system, a collection of images from one or more image sources;
  generating, based on the collection of images, a network graph, wherein each node of a plurality of nodes of the network graph represents an image of the collection of images, and wherein each link of a plurality of links of the network graph represents a context associating at least two nodes;
  providing, by the one or more modules of the predictive content performance system, the context to at least one user;
  serially causing display, by the one or more modules of the predictive content performance system, of pairs of images from the collection of images on a first computer interface, wherein the pairs of images are associated by the context;
  receiving, by the one or more modules of the predictive content performance system, from the at least one user, multiple user responses indicative of which image of each pair of images displayed on the first computer interface is preferred in view of the context;
  determining, using a ranking algorithm, a resonance value for each image of the collection of images based, at least in part, on a number of times the user responses indicate each image of the collection of images is preferred when displayed in a pair of images;
  aggregating user response data based on receiving the user responses for the pairs of images from the collection of images;
  generating a similarity vector for each image of the collection of images by comparing at least a first attribute of each image with at least a second attribute of a subset of images of the collection of images, the first attribute including pixel data;
  generating, by the one or more modules of the predictive content performance system, a training dataset comprising at least the collection of images, the user responses, the resonance value for each image of the collection of images, and the similarity vector for each image of the collection of images;
  generating, by the one or more modules of the predictive content performance system, based on the training dataset, one or more models for predicting image performance by training a machine learning algorithm to label each image of a plurality of images with a respective resonance value;
  providing, by the one or more modules of the predictive content performance system, to the one or more generated models, a plurality of candidate images for a creative campaign;
  determining, by the one or more generated models, a set of resonance values for the plurality of candidate images for the creative campaign; and
  causing display, by the one or more modules of the predictive content performance system, of a listing of the candidate images on a second computer interface, the listing comprising a resonance value of the set of resonance values for each candidate image of the plurality of candidate images.

17. The non-transitory computer-readable storage medium of claim 16, wherein:
  the context is indicative of a segment selected from one of an interest segment, a business segment, or an audience segment;
  the network graph includes two or more nodes of the plurality of nodes connected by one or more of the plurality of links, each node associated with an image related to the segment; and
  serially causing display of the pairs of images comprises selecting the pairs of images from a first node and a second node in the network graph that are separated by one link.

18. The non-transitory computer-readable storage medium of claim 16, wherein the method further comprises:
  receiving advertisement performance data for a plurality of advertisements, wherein each advertisement of the plurality of advertisements displays a candidate image from the plurality of candidate images;
  determining, for each image displayed in an advertisement, an aggregate score based, at least in part, on the resonance value of the set of resonance values for each candidate image; and
  validating the one or more generated models for predicting image performance based, at least in part, on comparing the respective aggregate score and the respective advertisement performance data.

* * * * *